United States Patent [19]

Hirai

[11] Patent Number: 4,978,901
[45] Date of Patent: Dec. 18, 1990

[54] MACHINING DATA FORMING SYSTEM FOR NUMERICAL CONTROL DEVICE

[75] Inventor: Hayao Hirai, Aichi, Japan

[73] Assignee: Mitsubishi Denki Kabushiki Kaisha, Tokyo, Japan

[21] Appl. No.: 352,529

[22] Filed: May 16, 1989

[30] Foreign Application Priority Data

May 16, 1988 [JP] Japan .................. 63-116948

[51] Int. Cl.[5] .......................................... G05B 19/403
[52] U.S. Cl. ................. 318/600; 318/568.1; 318/568.25; 364/474.22; 364/474.26; 364/474.29
[58] Field of Search ........... 318/568.1, 568.13, 568.19, 318/568.2, 568.25, 600; 82/118; 299/1; 340/721; 358/101; 364/474.22, 474.25, 474.26, 474.28, 474.29, 474.32, 474.34, 474.36, 188; 408/3, 12, 13, 16; 434/321, 322, 323, 307

[56] References Cited

U.S. PATENT DOCUMENTS

| | | | |
|---|---|---|---|
| 4,118,660 | 10/1978 | Otsuki et al. | |
| 4,135,239 | 1/1979 | Hamill, III et al. | 364/474.28 X |
| 4,464,124 | 8/1984 | Romero et al. | 434/321 |
| 4,556,957 | 12/1985 | Ichikawa | 318/568.1 X |
| 4,628,444 | 12/1986 | Nozawa et al. | 364/188 |
| 4,643,622 | 2/1987 | Winski | 364/474.28 X |
| 4,644,460 | 2/1987 | Kishi et al. | 318/568.1 X |
| 4,646,228 | 2/1987 | Ikeda | 364/474.26 X |
| 4,700,290 | 10/1987 | Ichikawa | |
| 4,704,689 | 11/1987 | Asakura | 364/474.32 X |
| 4,723,207 | 2/1988 | Isobe et al. | 364/188 X |
| 4,914,364 | 4/1990 | Hirai | |

OTHER PUBLICATIONS

Bendix Dynapath System 10, Bendix, Industrial Controls Division, Detroit, Mich.

Primary Examiner—Bentsu Ro
Attorney, Agent, or Firm—Sughrue, Mion, Zinn, Macpeak & Seas

[57] ABSTRACT

A machining data forming system for a numerical control device in which machining data are inputted through interaction with a display unit. Since the present system is provided with a machining menu for a variety of machining position patterns, it is unnecessary to obtain the center or position coordinates of the machining position patterns. As a result, the number of interactive data inputting steps can be reduced to thereby improve the program inputting efficiency.

12 Claims, 26 Drawing Sheets

FIG. 5(A)

| | POSITIONING DIRECTION | START POINT COORDINATES | END POINT COORDINATES | MACHINING POINT NUMBER/ EQUAL DIVISION ANGLE | PRESENCE OR ABSENCE OF START POINT MACHINING | RADIUS | CENTER COORDINATE DIRECTION |
|---|---|---|---|---|---|---|---|
| FIG. 5B(a) | CW | Xs Ys | Xe Ye | Nn | 1 | Rn | ↓ |
| FIG. 5B(b) | CW | Xs Ys | Xe Ye | An | 1 | Rn | ← |
| FIG. 5B(c) | CCW | Xs Ys | Xe Ye | Nn | 1 | Rn | → |
| FIG. 5B(d) | CCW | Xs Ys | Xe Ye | An | 0 | Rn | ↑ |
| FIG. 5B(e) | CW | θs Rs | θe Re | Nn | 1 | Rn | ↓ |
| FIG. 5B(f) | CW | θs Rs | θe Re | An | 1 | Rn | ← |
| FIG. 5B(g) | CCW | θs Rs | θe Re | Nn | 0 | Rn | → |
| FIG. 5B(h) | CCW | θs Rs | θe Re | An | 0 | Rn | ↑ |

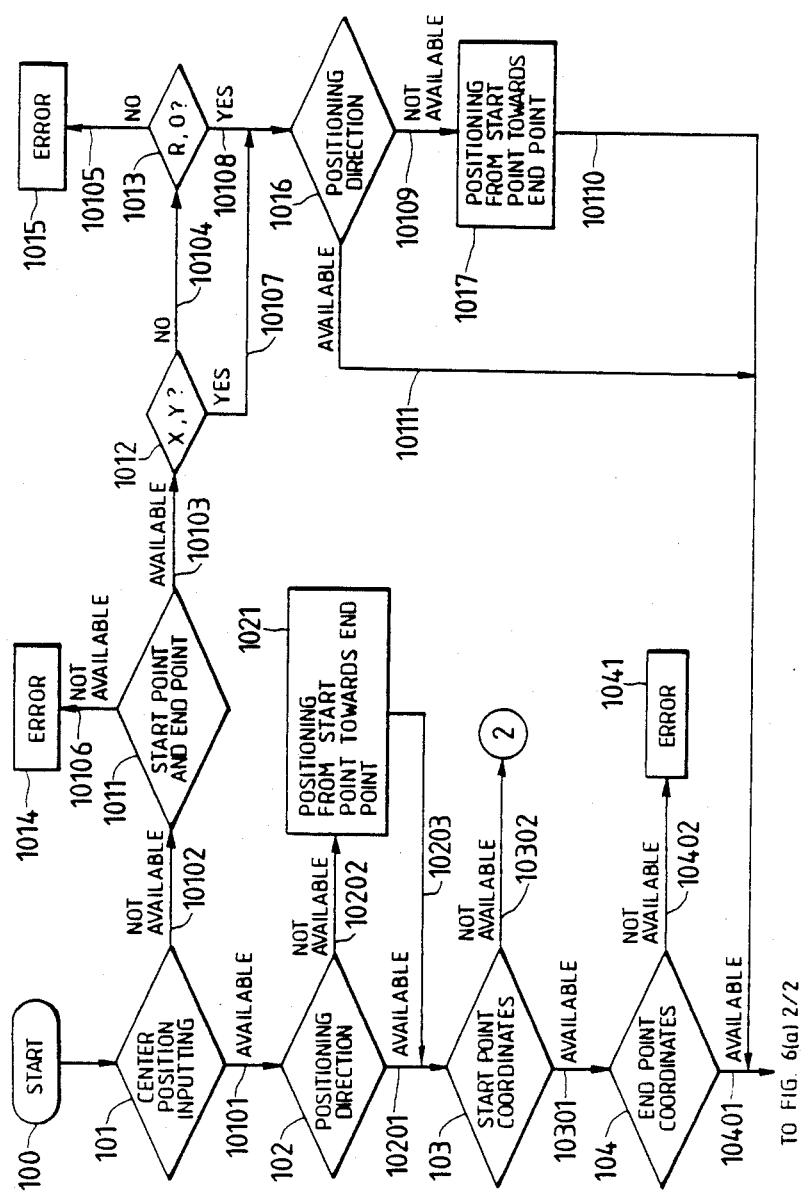

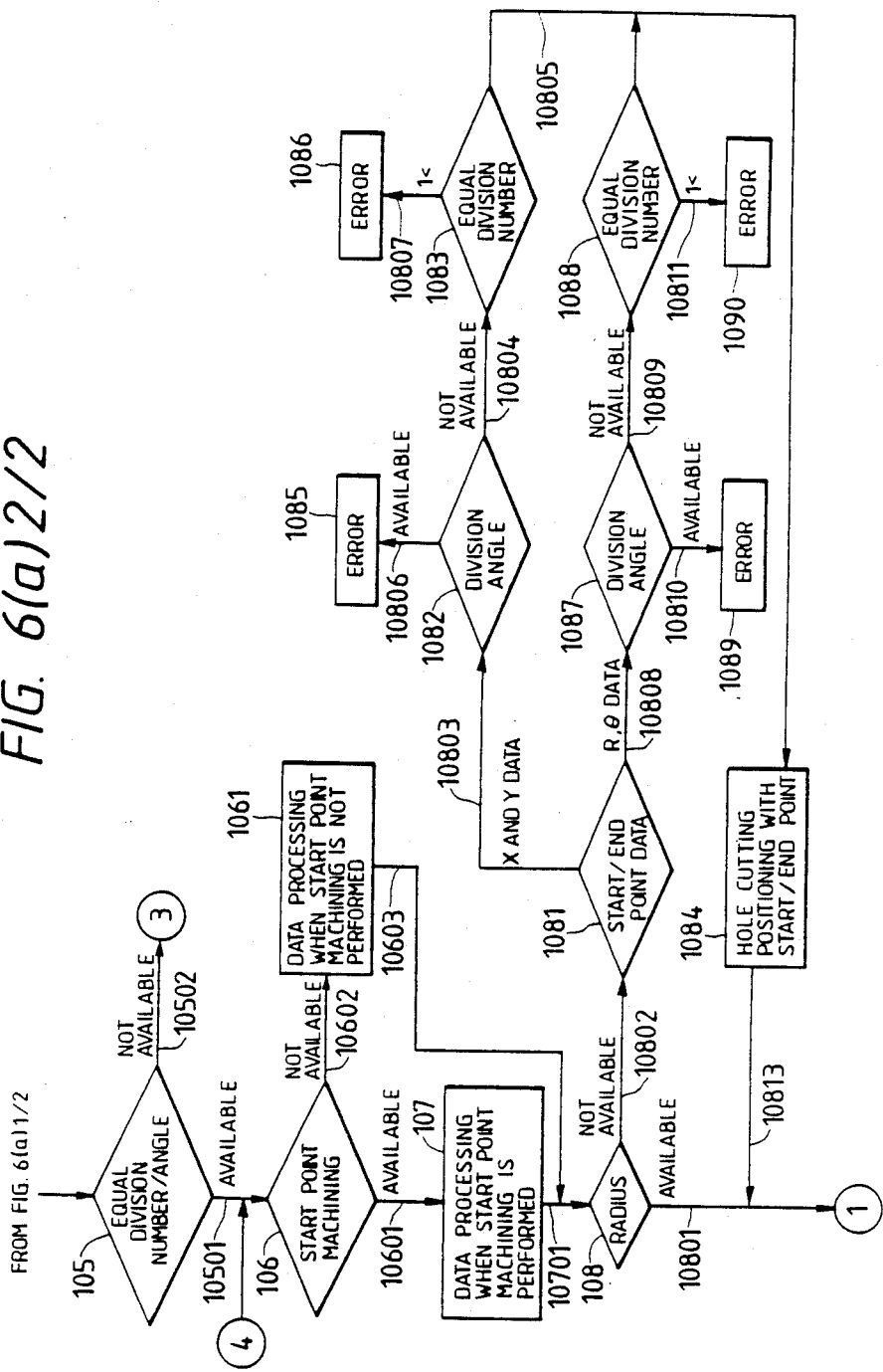
FIG. 6(a)2/2

FIG. 18

300 — MACHINING STEP LIST

1. MACHINING STEP DATA

| NO. | STEP NAME | T NO. | TOOL NAME | ATC | H | D | RPM | FEED | TOOL LENGTH | TOOL DIAMETER | COOLANT | MACHINING DEPTH |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

TIP MATERIAL — T FUNCTION — SURFACE

MACHINING STEP DATA

MACHINING DATA FORMING SYSTEM FOR NUMERICAL CONTROL DEVICE

BACKGROUND OF THE INVENTION

The present invention relates to a machining data forming system, with respect to an automatic program, for a numerical control device adapted to control machine tools, robots, laser machining apparatuses, welding machines, adhesive coating machines. A conventional method of inputting and processing data, with respect to an automatic program, for a numerical control device is as follows:

FIG. 9 is a flow chart outlining the conventional method for forming machining data, and FIG. 10 is an explanatory diagram showing a data setting and displaying device with which the operator inputs data by operating an AUTO PRO switch, DISPLAY switch, PARAMETER switch, NC AID switch, etc. through interaction, and observes the data displayed thereon.

As shown in FIG. 10, a CRT display section such as a 14-inch color CRT has a various-data display region 11, an echo data display region 12, and a question and alarm message display region 13. In the following description, the quotation marks (") are placed before and after the names of key switches, for clarification.

An operating section 2 includes a group of echo switches 201 through 208, a "DISPLAY" switch 210, a "PARAMETER" switch 211, an "NC AID" switch 212, an "AUTOMATIC PROGRAM" switch 213, and "UP-DOWN CHANGE-OVER" switch 214.

A data input section 3 includes a group of various data keys 301 such as alphabetical and numerical keys, a group of input operation keys 302 (including "↑", "←", "↓" and "→" cursor keys 3022, a "NEXT PICTURE" key 3021, an "AUTOMATIC PRO GRAPHIC" key 305, an "INPUT" key 304, etc.), and operation preparation and NC alarm display LEDs 310.

The CRT display section 1 can display more than seventy pictures such as a machining definition start picture (FIG. 11), machining type selection picture (FIG. 12), drilling configuration selection picture (FIG. 13), drill hole machining configuration definition picture (FIG. 14), drilling pattern selection picture (FIG. 15), drilling (arc) pattern definition picture (FIG. 16), drilling (bolt hole, circle) pattern definition picture (FIG. 17), machining step list picture (FIG. 18), and NC data output picture (FIG. 19), which are utilized for a description of the invention as follows:

A conventional inputting and processing method with an automatic program will be described with reference to the inputting procedure in a drilling operation which is shown in FIGS. 7(a) and 7(b).

FIG. 7(a) is a plan view showing the position of holes to be drilled in a workpiece, and FIG. 7(b) is a sectional view taken along a line A—A in FIG. 7(a), showing dimensions in a direction of height.

An inputting operation is carried out according to the flow chart of FIG. 9.

For simplification in description, with the assumption that Steps 1 (automatic program start ) through 6 (graphic display) which are not directly concerned with the invention have been accomplished, the description will be made beginning with Step 7.

When the "NET PICTURE" key 3021 (FIG. 10) is depressed at the end of Step 6, the present picture is switched over to the machining definition start picture (FIG. 11). When the echo switch 201 (FIG. 10) corresponding to "1. MACHINING DEFINITION START" in the echo data display section 12 (FIG. 10) is depressed, the picture is switched over to the machining type selection picture (FIG. 12). FIG. 7 is for a drilling operation, and therefore, when the echo switch 201 (FIG. 10) corresponding to "1. drilling" 1211 (FIG. 12) is depressed, the picture is switched over to the drilling configuration selection picture (FIG. 13); and when the echo switch 201 (FIG. 10) corresponding to "1. DRILL HOLE" 1221 (FIG. 13) is depressed, the picture is switched over to the drilling configuration definition picture (FIG. 14).

According to data displayed on the question section 13 (FIGS. 10 and 14), the data keys 301 (FIG. 10) and the "INPUT" key 304 (FIG. 10) are operated. As a result, questions are successively displayed. In response to the questions thus displayed, the corresponding data are inputted with the keys. Thus, the setting of the necessary data has been accomplished.

That is, the machining configuration definition (Step 7 in FIG. 9) has been accomplished. When, under this condition, the "NEXT PICTURE" key 3021 (FIG. 10) is depressed, the picture is switched over to the drilling pattern selection picture (FIG. 15) corresponding to the machining position pattern definition in Step 8. The drilling position shown in FIG. 7 corresponds to "1. ARC" pattern in the displayed picture 11 (FIG. 15). Therefore, the echo switch 201 (FIG. 10) corresponding to "1. ARC" pattern 1231 in the displayed picture 11 (FIG. 15) is depressed, as a result of which the picture is switched over to the drilling (arc) pattern definition picture (FIG. 16). According to the picture shown in FIG. 16, the inputting of data is started.

As for "1. CENTRAL POSITION X=( ), Y=( )" of the group of questions in the data display section 11, since central position (a, b) is not specified in the picture (FIG. 7), the operator calculates it manually or with a desk top electronic calculator taking about ten minutes in maximum.

One example of the central position calculating operation will be described with reference to FIGS. 20(a) to (c). First, the operation in the case where, as shown in FIG. 20(b), a machining start point (Xs, Ys), a machining end point (Xe, Ye), and a radius Rn have been inputted will be described according to a flow chart shown FIG. 20(a).

Presence or absence of X and Y data (Step 2000): When available, the following operations are carried out:

$$Xe - Xs = XL$$

$$Ye - Ys = YL$$

Is $|XL|$ zero or $2 \cdot Rn$? (Step 2002):

If NO, it is determined whether or not $0 < |XL| < 2Rn$ is held (Step 2003). If YES, the central position (a, b) is obtained by inserting the machining start point (Xs, Ys), the machining end point (Xe, Ye) and the radius Rn in the following equations (Step 2004):

$$(Xs - a)^2 + (Ys - b)^2 = Rn^2$$

$$(Xe - a)^2 + (Te - b)^2 = Rn^2$$

After $|XL|$ has been determined zero (0) in the above-described Step 2002, determination is given to $|YL|$ (Step 2006). When it is determined that $0 < |YL-$

|<2Rn is established, then Step 2004 is effected; that is, the above-described calculations are carried out to obtain the central position (a, b). When, in Step 2006, it is determined that |YL|=2Rn, then it is determined whether YL is larger or smaller than zero (0) (Step 2008). When YL>0, the central position (a, b) is obtained according to the following equations (Step 2009):

$$a = Xe$$

$$b = Ye - Rn$$

When YL<0, the following equations are used to obtain the central position (Step 2010):

$$a = Xs$$

$$b = Ys - Rn$$

When it is determined that, in Step 2002, |XL|=2Rn, then it is determined whether XL is larger or smaller than zero (0). (Step 2011). When XL>0, the central position (a, b) is obtained according to the following equations (Step 2012):

$$a = Xe - Rn$$

$$b = Ye$$

When XL<0, the following equations are used to obtain the central position (a, b) (Step 2013):

$$a = Xs - Rn$$

$$b = Ys$$

when, during the above-described arithmetic operation, it is determined that |XL|>2Rn in Step 2003, and it is determined that |YL|>2Rn in Step 2006, errors are resulted because those conditions are not established (Steps 2005 and 2007).

FIG. 20(c) shows the case where the start point coordinates and the end point coordinates are determined by using distances Rs and Re from the original point and angles $\theta$s and $\theta$e. If, in the determination of whether or not X and Y data are available (Step 2000), the result is "NO", then it is determined whether or not R and $\theta$ data are available (Step 2014), and X and Y data are calculated according to the following equations by using the R and $\theta$ data (Step 2015):

$$Xs = Rs \cos \theta s$$

$$Ys = Rs \sin \theta s$$

$$Xe = Re \cos \theta e$$

$$Ye = Re \sin \theta e$$

Thereafter, Step 2001 is effected, and the operation is carried out similarly as in the case of X and Y data.

If, in Step 2014, it is determined that no R and $\theta$ data are available, then an error is resulted because only X and Y data and R and $\theta$ data are handled in this case (2016).

The central position coordinates (a, b) obtained through an arithmetic operation shown in FIG. 20(a) are inputted with the data keys 301 (FIG. 10), and set with the "INPUT" key 304 (FIG. 10).

Thereafter, in the data display region 11, the questions are provided successively in the order listed therein. For each of the questions thus provided, similarly as in the above-described case, data are inputted by using the data keys 301 (FIG. 10) and set with the "INPUT" key 304 (FIG. 10).

After a data inputting and setting operation for the last question "9. QUESTION FOR RETURN POSITION", the "AUTOMATIC PRO GRAPHIC" key 305 (FIG. 10) is depressed, and then a machining pattern graph is displayed.

Thereafter, the figure in the picture displayed is compared with FIG. 7 for any error. After it has been confirmed that no error is involved, the "NEXT PICTURE" key 3021 (FIG. 10) is depressed, so that the drilling pattern selection picture (FIG. 15) is displayed again (Step 91 in FIG. 9).

Since the data have been inputted and set, the echo switch 208 (FIG. 10) corresponding to "8. DEFINITION END" is depressed, as a result of which the machining definition start picture (FIG. 11) is displayed again (Step 81 in FIG. 9) while the machining definition list 110 is displayed on the data display section 11. The list is compared with the drawing (FIG. 7) for any error. After it is confirmed that there is no error, the echo key 208 (FIG. 10) corresponding to "8. MACHINING DEFINITION END" 1208 is depressed. As a result, Step 10 (FIG. 9) is effected through Step 71 (FIG. 9), and the picture is then switched over to the machining step list picture (FIG. 18).

When the "NEXT PICTURE" KEY 3021 (FIG. 10) is depressed while the last machining data in the list is being displayed on the question region 13 by operating the cursor keys 3022 (FIG. 10), Step 11 (FIG. 9) is effected, so that the picture is switched over to an NC data forming picture (FIG. 19). A necessary program name, program number, and "YES" for "NC data formation?" are inputted. As a result, NC data are automatically formed, and "NC DATA HAVE BEEN FORMED" is displayed on the question region 13 (FIG. 10). Thus, the operation has been accomplished. When the "NEXT PICTURE" key 3021 is depressed for instance for the next work, then the operation is returned to the first Step 0 through Step 12.

In the case where holes are drilled at intervals of irregular pitch or irregular angle, heretofore the data are inputted and set as follows: According to the drilling (arc) pattern definition picture (FIG. 16), the first and second machining points are assigned to the first group (FIG. 8(b)), the third and fourth machining points to the second group (FIG. 8(c)), and the fifth and sixth machining points to the third group (FIG. 8(d)).

In the data inputting and setting method, the data for the first group of machining points are inputted and set, according to the above-described method (FIG. 9), through the machining configuration definition (Step 7), the machining position pattern definition (Step 8) and the graphic display (Step 9). Thereafter, the operation returning to Step 88 through Step 91, the data inputting and setting operation for the second group of machining points (FIG. 8(c)) is started. The machining position pattern definition (Step 8) and the graphic display (Step 9) are carried out. Then, the operation is returned to Step 8 through Step 91, so that the data inputting and setting operation for the third group of machining points (the part (d) of FIG. 8) is started. The machining position pattern definition (Step 8), the graphic display (Step 9) and Step 9 are carried out again. When the data inputting and setting operations for all the groups of machining points have been accomplished in this manner, the Steps 81 and 71 are effected, and, similarly as in the above-described case, Steps 10, 11 and 12 are effected. Then, the operation has been ended.

In the above-described case, Steps 8, 9 and 91 are repeated three times for inputting and setting the data. That is, if, in drilling holes equal in diameter and in depth, the machining position pattern is not included in the menu, then it is necessary to divide the data for them in inputting them. Accordingly, it is necessary to repeat Steps 8, 9 and 91 the same times as the number of division.

The conventional numerical control device input format is arranged as described above. Therefore, in the case where for instance the central position is not indicated in the drawing, the operator inputs it by calculating unknown data according to the mounting positions and dimensions indicated in the drawing; or in the case where holes to be drilled are positioned at intervals of irregular pitch or irregular angle, the holes are assigned into a plurality of groups to input the data. Thus, the data inputting and setting operation is troublesome.

Accordingly, the program inputting operation is low in efficiency. In addition, for instance when data inputted is being processed although the machining operation has not been finished, the operation of the machining is suspended until the arithmetic operation ends.

SUMMARY OF THE INVENTION

Accordingly, an object of this invention is to eliminate the above-described difficulties accompanying a conventional data inputting and setting method of numerical control device. More specifically, an object of the invention is to provide a machining data forming system for a numerical control device in which, in inputting the data of machining points arranged on an arc or circumference, it is unnecessary to perform manual calculation or to divide the machining points into a plurality of groups, and the data can be inputted with a simplified format.

In a machining data forming system for a numerical control device in which machining data are inputted through interaction with a display unit, according to the invention, a picture means including questions for inputting the coordinates of start and end points is provided, and the coordinates of the center thereof are determined according to the coordinates of the start and end points thus inputted.

Furthermore, in the system of the invention, in order to input machining points on an arc or circle, a picture means including questions for inputting a random pitch angle is provided, so that the coordinates of the machining points are determined according to the pitch angle thus inputted, and a hole cutting pattern picture includes a "bolt hole arc/circle" pattern.

In addition, in the system of the invention, in order to specify a sequence of machining, a picture means including questions for inputting a positioning direction is provided, so that the sequence of machining is determined according to the positioned direction thus inputted; or in order to specify machining points, a picture means including questions for inputting the presence or absence of start point machining is provided, so that the machining points are determined according to the presence or absence of start point machining thus inputted.

In the system of the invention, the center position is automatically obtained with the aid of the coordinates of the start and end points even when the coordinates of the center is not given; and even if a random pitch angle, is given, the coordinates are automatically determined according to the angle.

BRIEF DESCRIPTION OF THE DRAWINGS

In the accompanying drawings:

FIG. 5(A) is a diagram showing in the form of a table using general data names examples of an input format according to the invention.

FIG. 6(a), 6(b) and 6(c) are a flow chart outlining the operation of machining points in the invention;

FIG. 8(a) is a master diagram showing all holes to be machined, and FIG. 8(b) are diagrams each showing two of the holes;

FIG. 18 is a diagram showing a machining step list picture;

DESCRIPTION OF THE PREFERRED EMBODIMENTS

Figure 1:
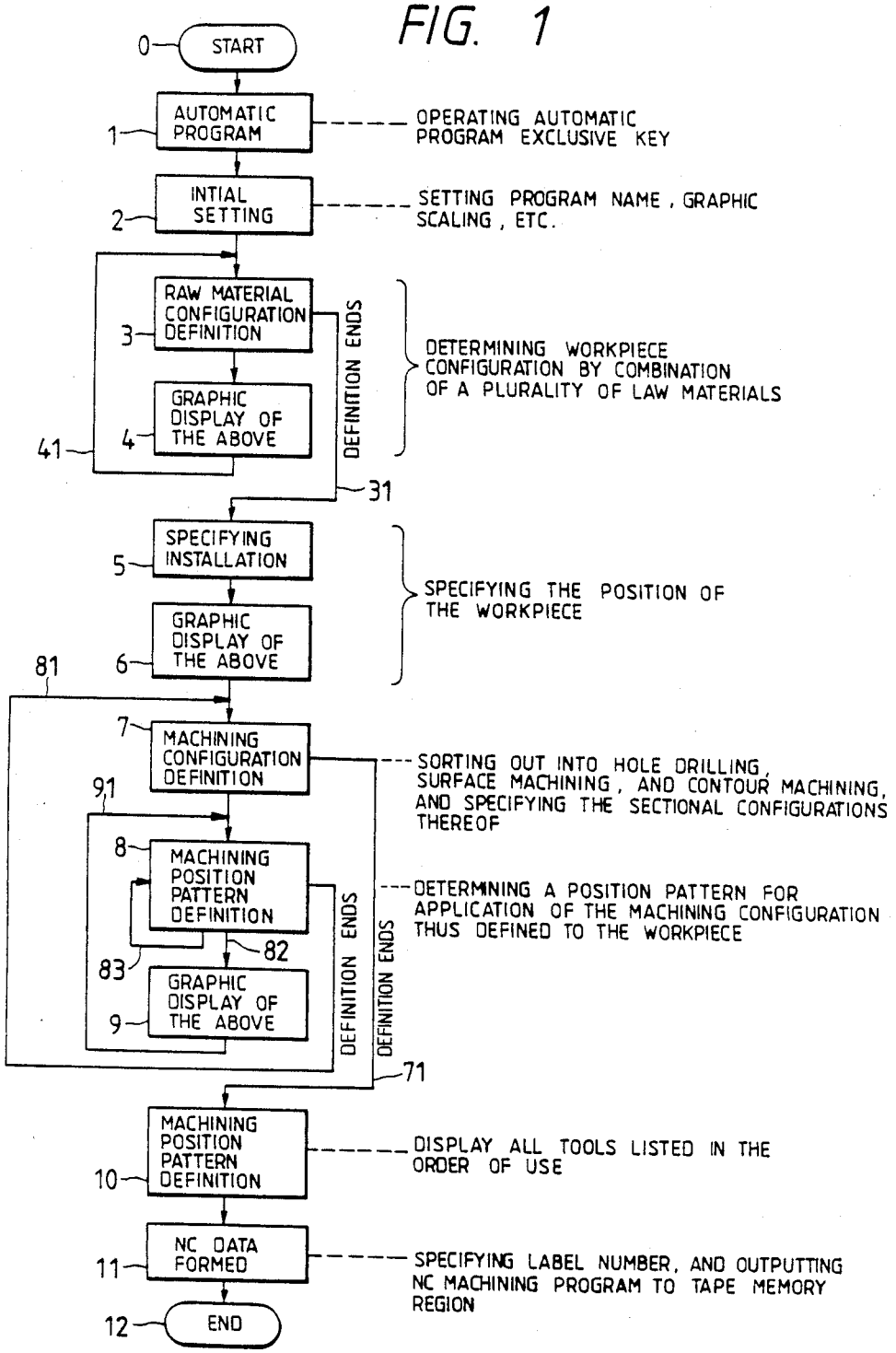
FIG. 1 is a flow chart outlining a procedure of inputting and processing data in this invention.
Figure 9:
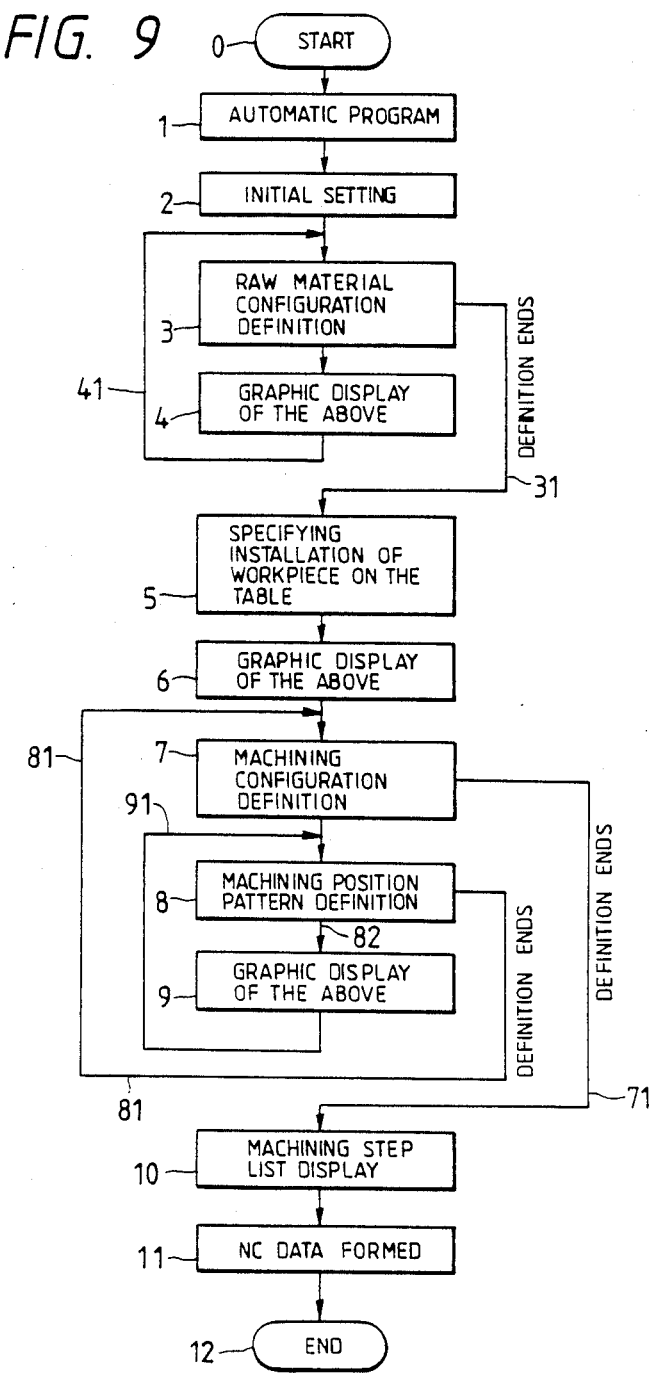
FIG. 9 is a flow chart outlining a conventional data inputting and processing method.

FIG. 1 is a flow chart outlining a method of inputting and processing data in an embodiment of the present invention. As is apparent from comparison of FIG. 1 with FIG. 9 the data inputting method is improved by adding Step 83 to the flow chart of FIG. 9 (the conventional method).

Figure 2:
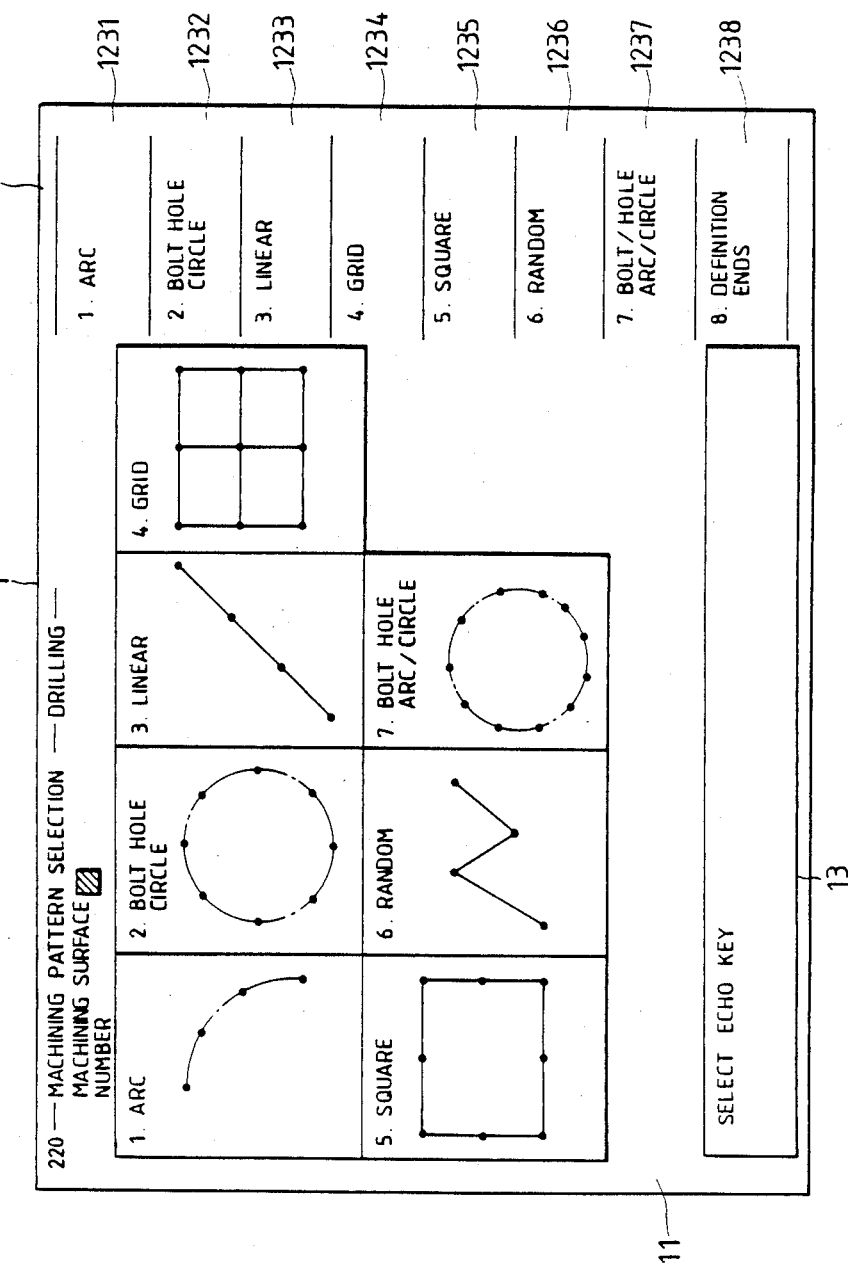
FIG. 2 is a diagram showing a drilling pattern section picture in the invention.
Figure 15:
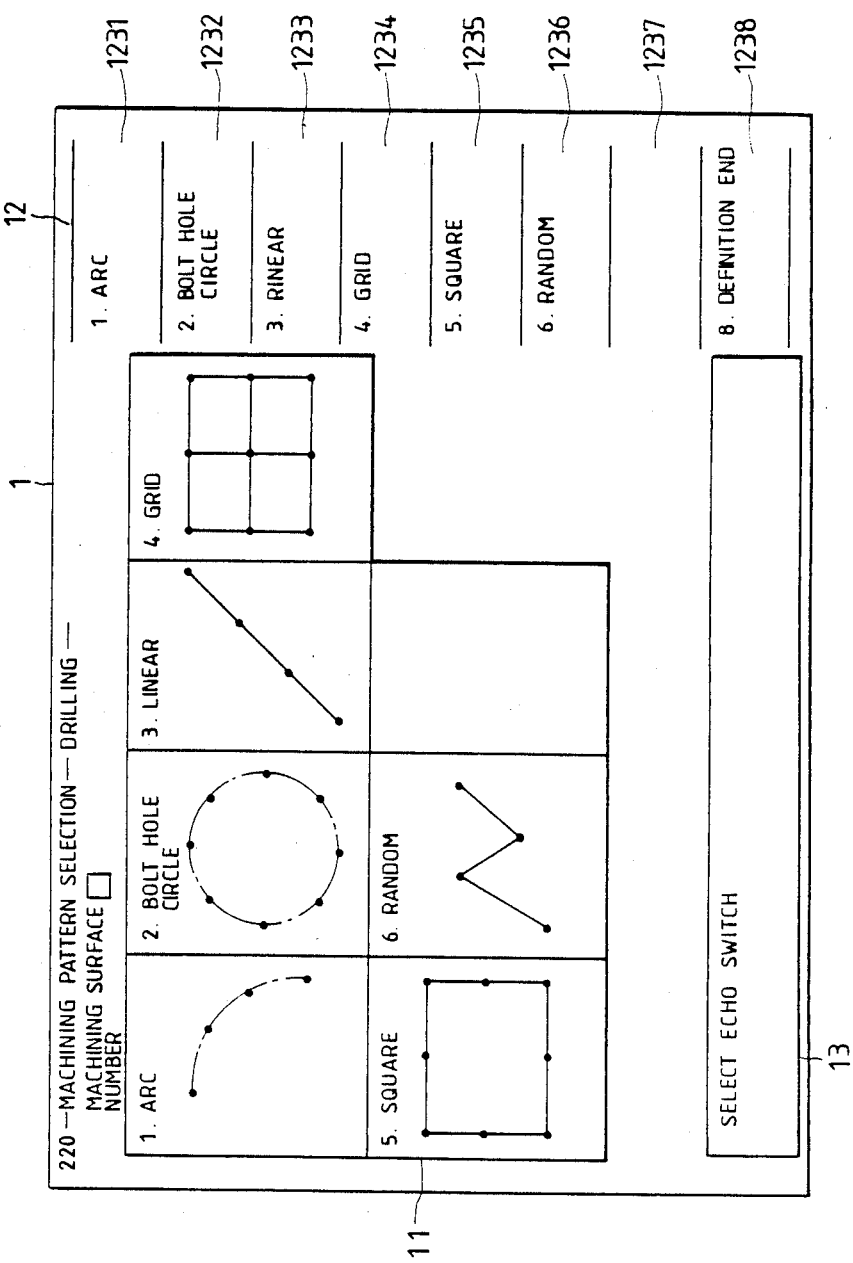
FIG. 15 is a diagram showing a conventional drilling pattern selection picture.

FIG. 2 shows a drilling pattern selection picture, which is obtained by adding a "7. BOLT HOLE ARC- /CIRCLE" pattern to FIG. 15 (the conventional method). With the drilling pattern selection picture, the echo data display section 12 (FIG. 10) is allowed to additionally display "7. BOLT HOLE ARC/CIRCLE" 1237, and the echo switch 207 corresponding thereto is operated.

Figure 3A:
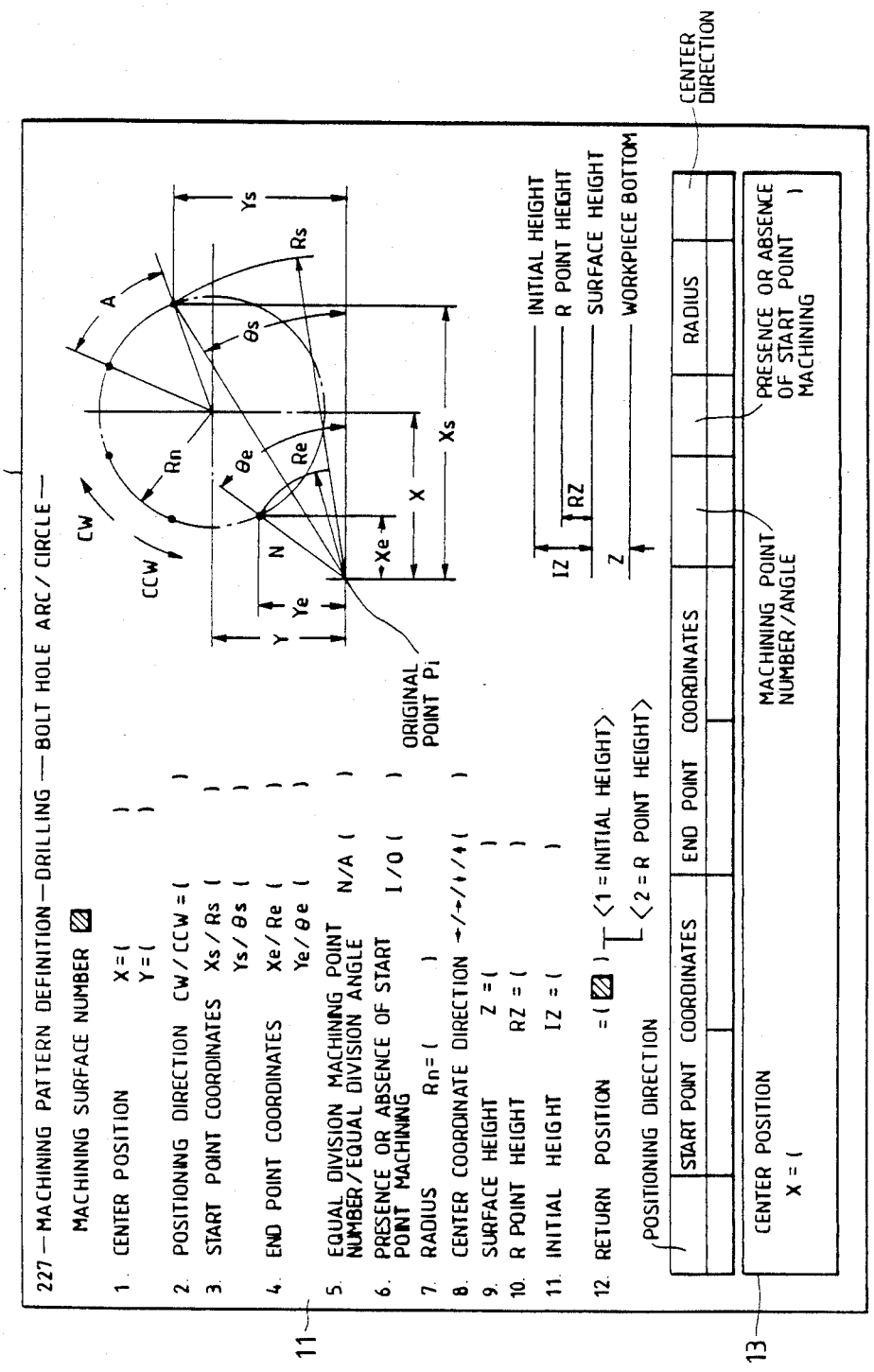
FIGS. 3(a) and 3(b) are diagrams showing a machining pattern definition picture (A) in the invention.
Figure 3B:
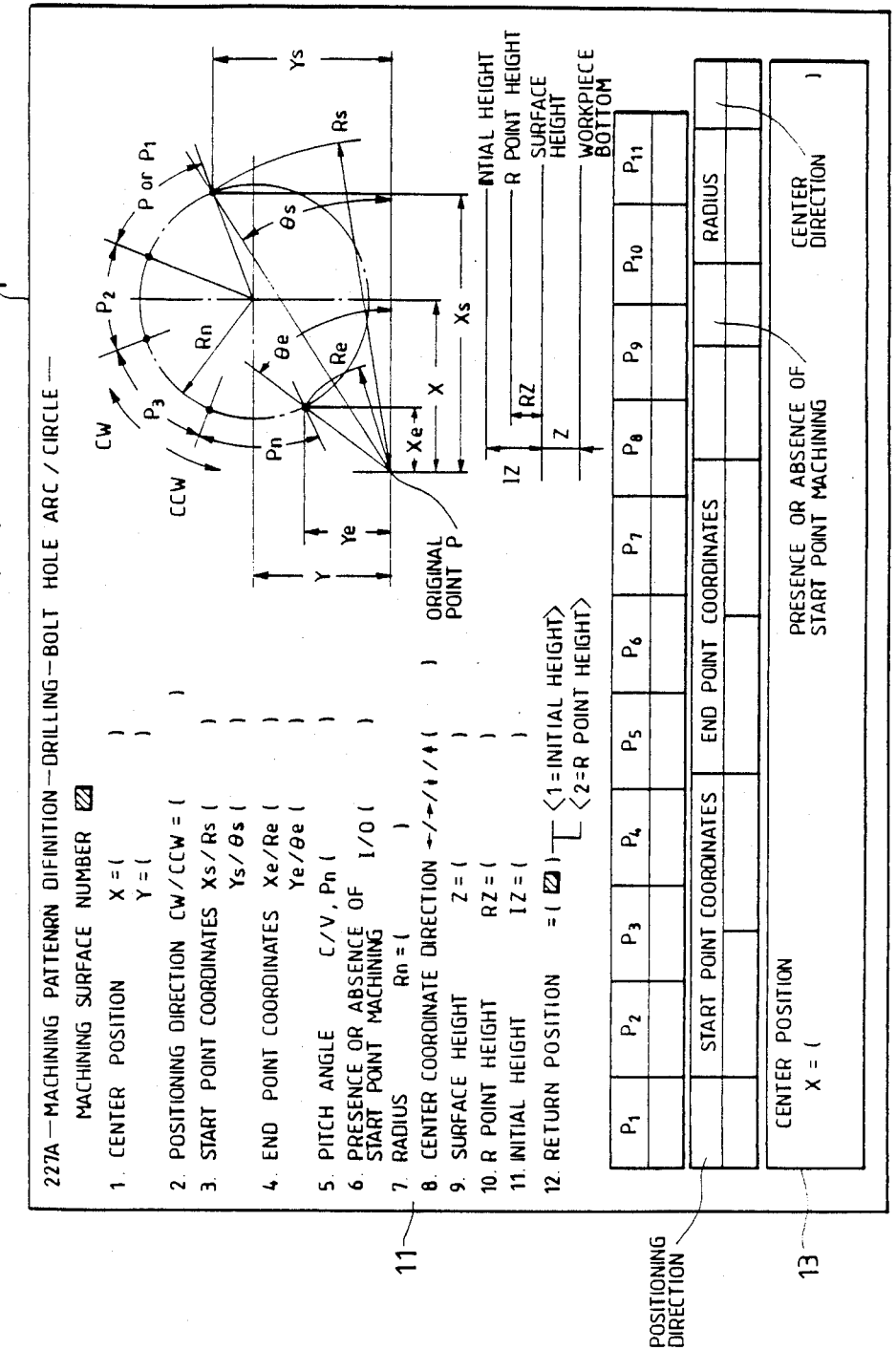
Figure 16:
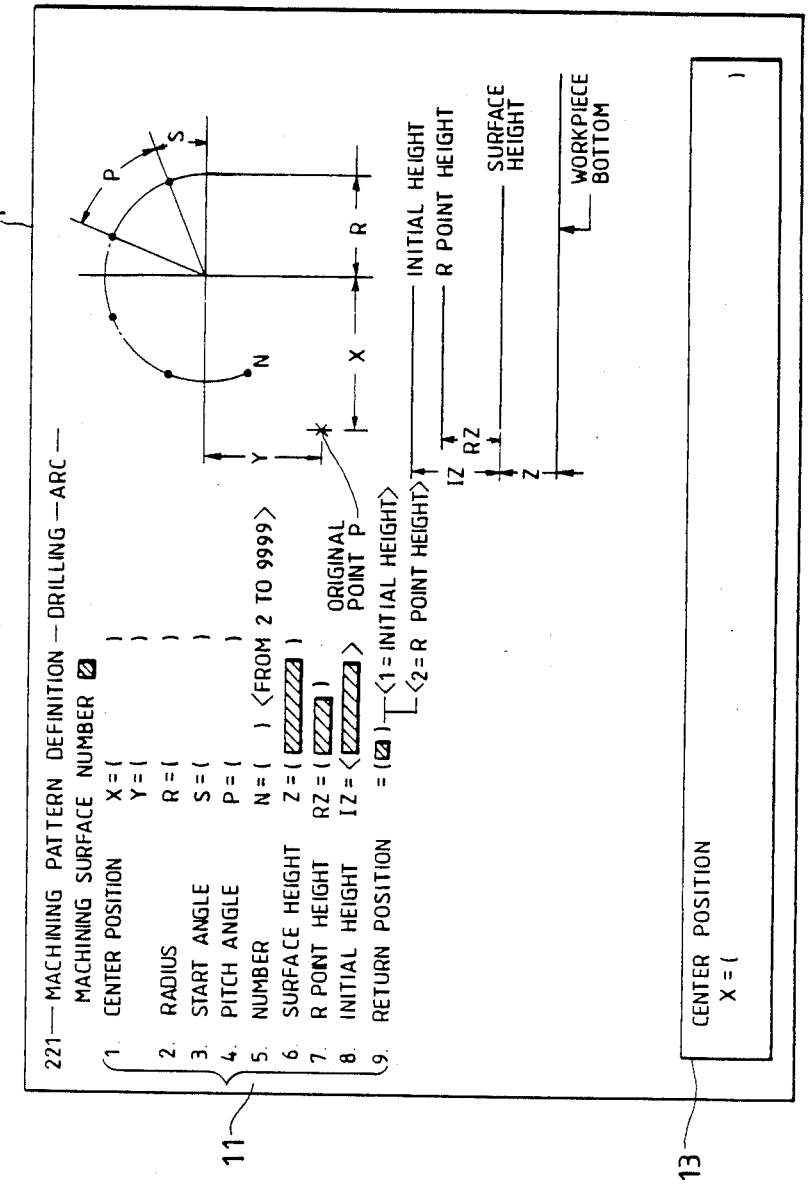
FIG. 16 is a diagram showing a conventional drilling (arc) pattern definition picture.

FIGS. 3(a) and 3(b) show a drilling (bolt hole arc/circle) pattern definition picture (A), which is obtained by adding to FIG. 16 (the conventional method) "2. POSITIONING DIRECTION CW/ CCW", "3. START POINT COORDINATE", "4. END POINT COORDINATES", "5. EQUAL DIVISION MACHINING POINT NUMBER/ EQUAL DIVISION ANGLE", "5a. PITCH ANGEL", "6. PRESENCE OR ABSENCE OF START POINT MACHINING", and "8. CENTRAL POINT COORDINATES DIRECTION".

Figure 4:
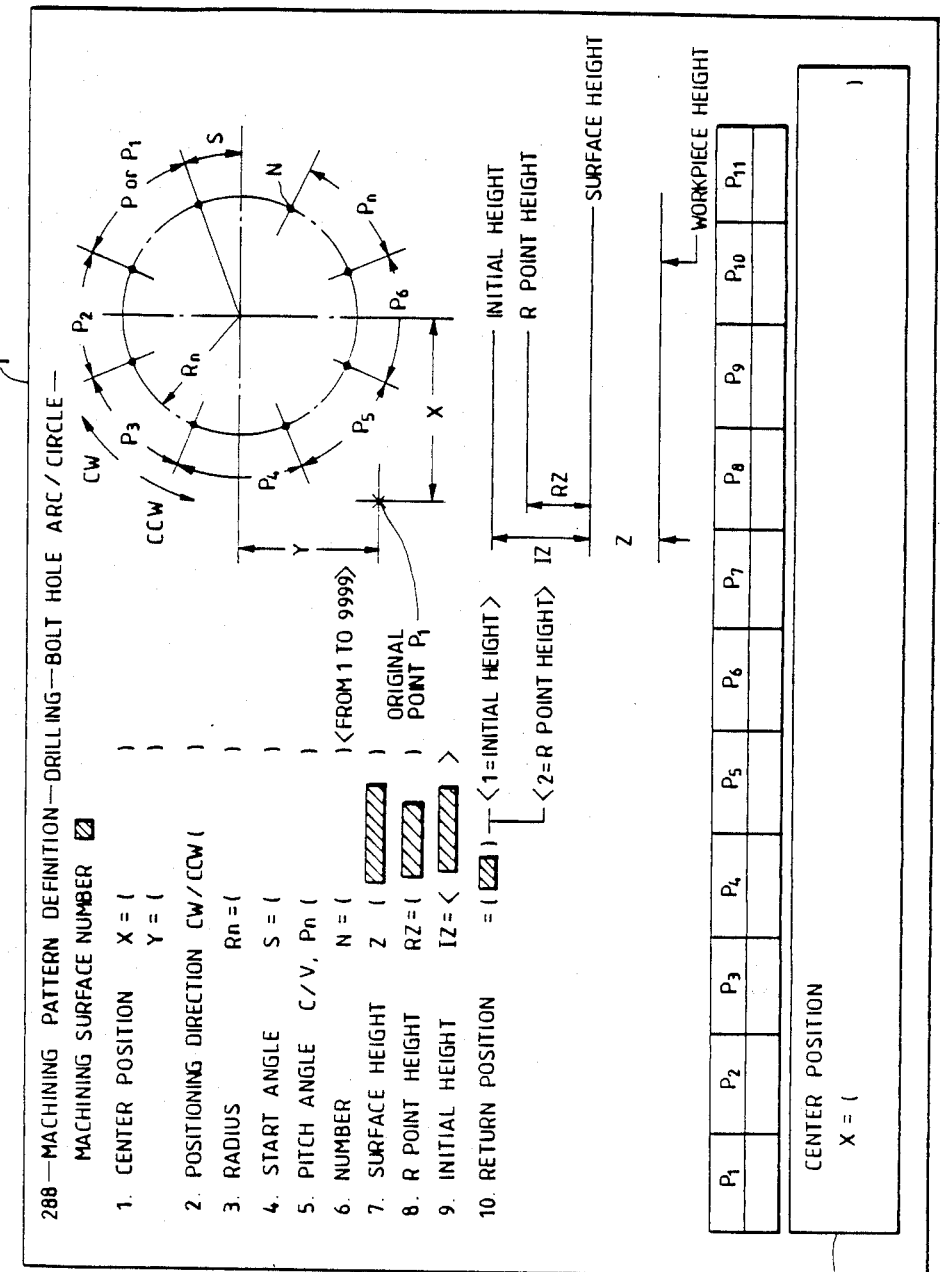
FIG. 4 is a diagram showing a machining pattern definition picture (B) in the invention.
Figure 17:
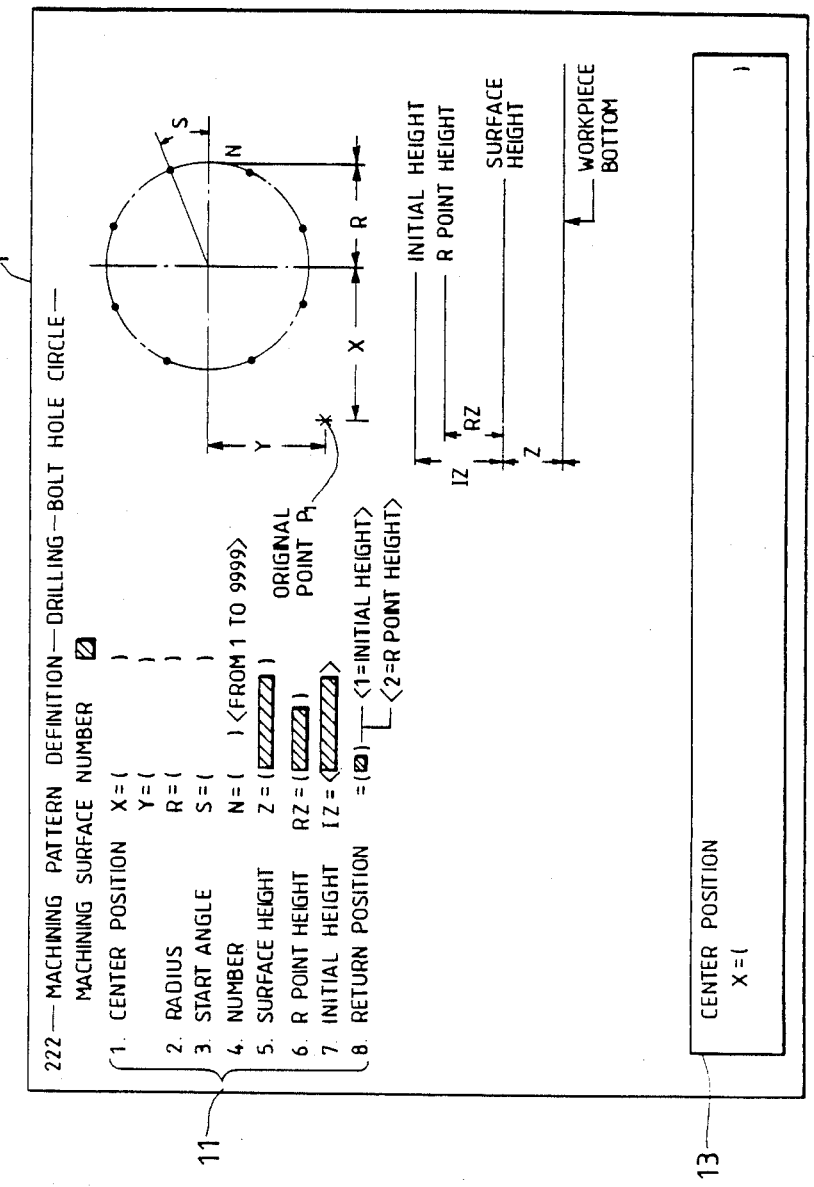
FIG. 17 is a diagram showing a conventional drilling (bolt hole arc) pattern definition picture.

FIG. 4 shows a machining pattern definition picture (B), which is obtained by adding "2. POSITIONING DIRECTION", and "5. PITCH ANGLE" to FIG. 17 (the conventional method).

FIG. 4 is provided as a sub picture for FIGS. 3(a) and 3(b). When the inputting of the third question "3 START POINT COORDINATES" in FIGS. 3(a) and 3(b) is skipped, then the picture of the part FIGS. 3(a) and 3(b) is switched over to that of FIG. 4, and the data of questions 1 and 2 inputted according to FIG. 3 remain, but those of the remaining questions are switched.

If the inputting of the fifth question "5. EQUAL DIVISION MACHINING POINT NUMBER/EQUAL DIVISION ANGLE" in FIG. 3(a) is skipped, then it is switched over to "5a. PITCH ANGLE", so that a pitch angle can be inputted freely.

Figure 5B:
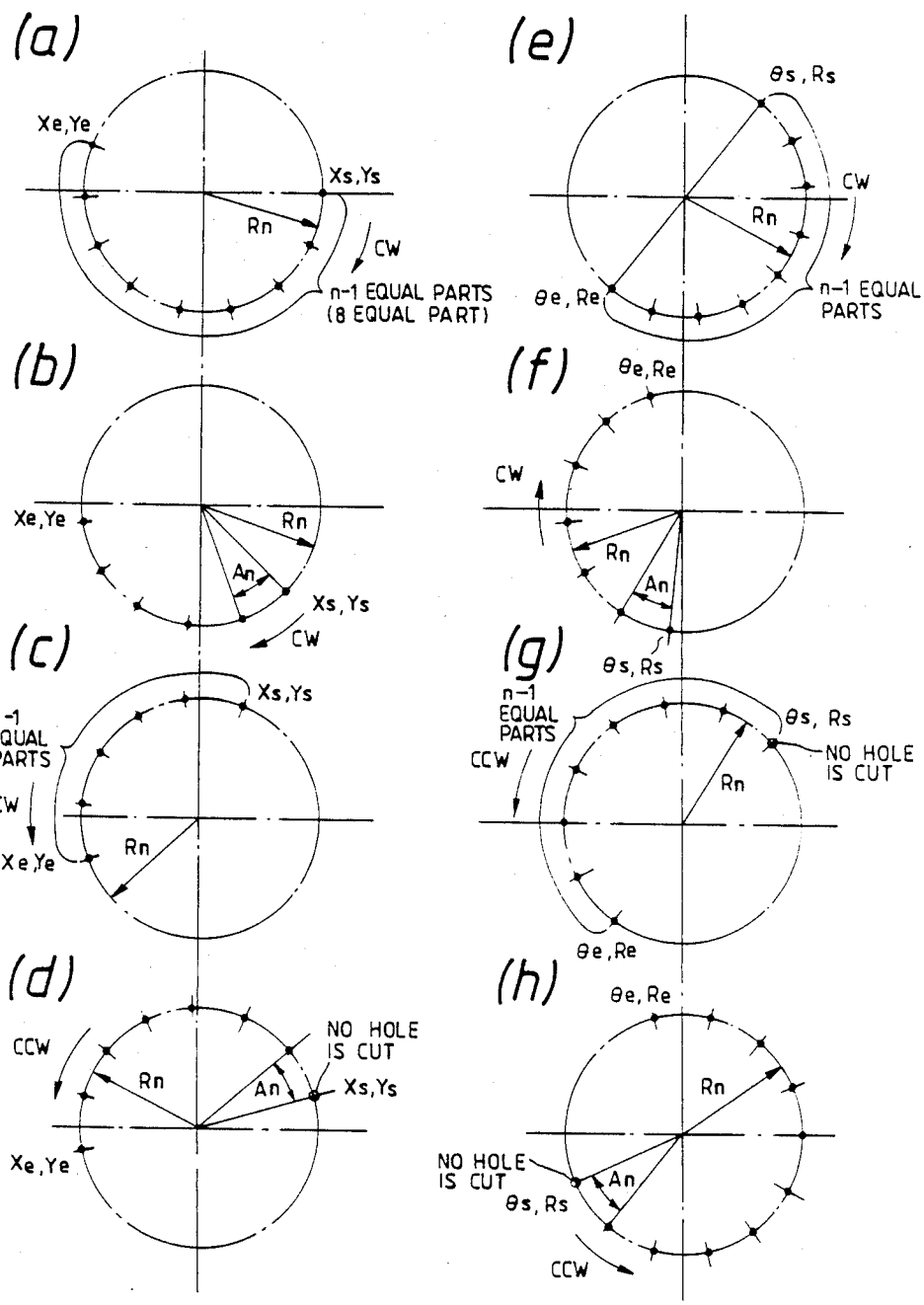
FIG. 5(B) is a diagram showing the input formats of FIG. 5(A) in a plane.

FIG. 5(A) is a table showing examples of an input format with general data names, and FIG. 5(B) is a schematic diagram showing the examples of the input format of FIG. 5(A) in a plane.

Figure 6B:
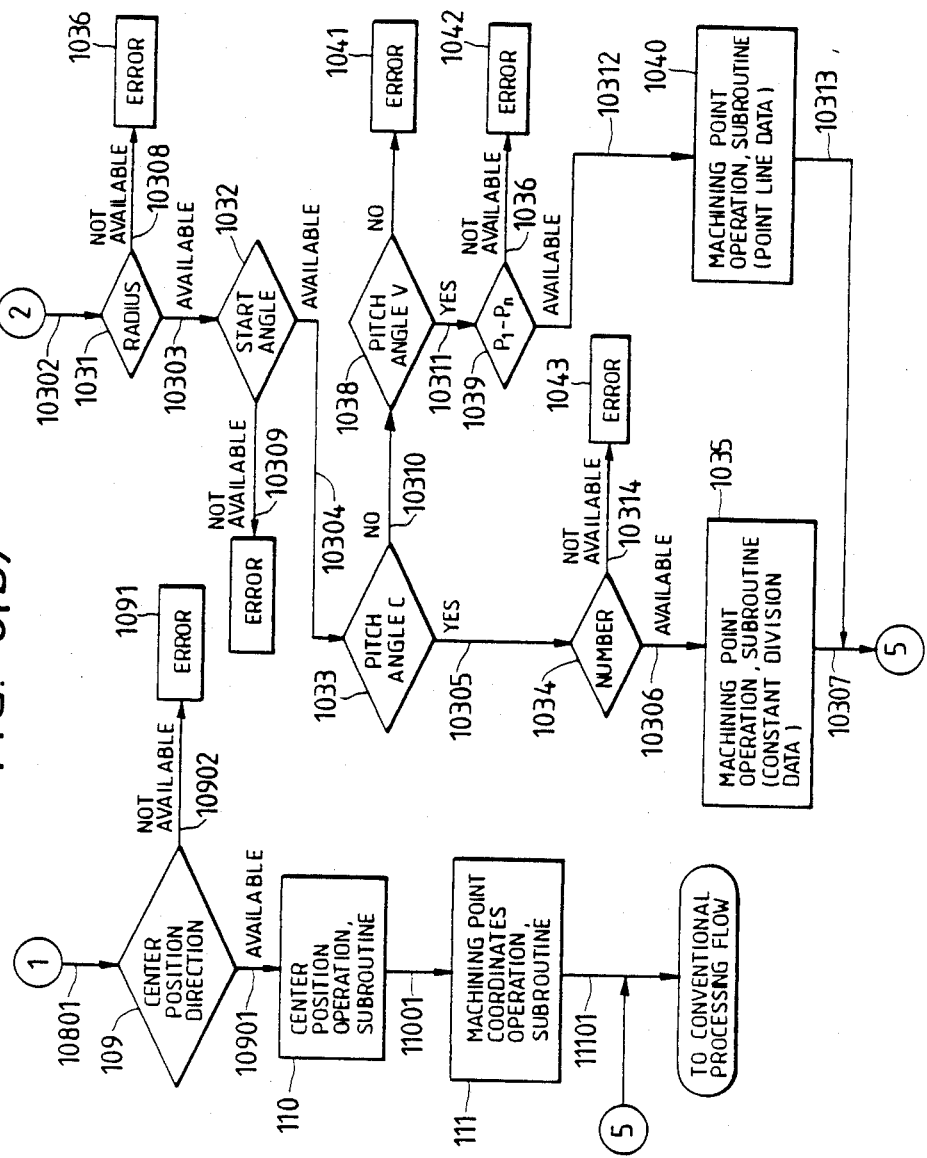
Figure 6C:
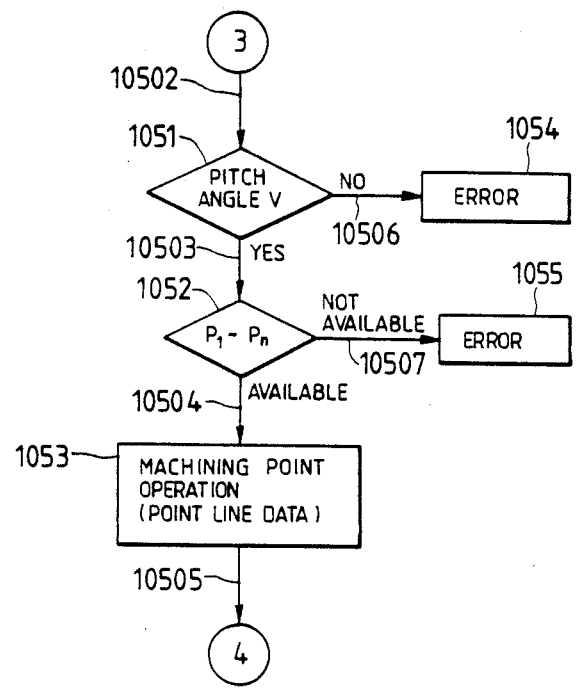

FIGS. 6(a), 6(b) and 6(c) are flow charts showing a procedure of operating data in Step 11 in FIG. 1.

Figure 7A:
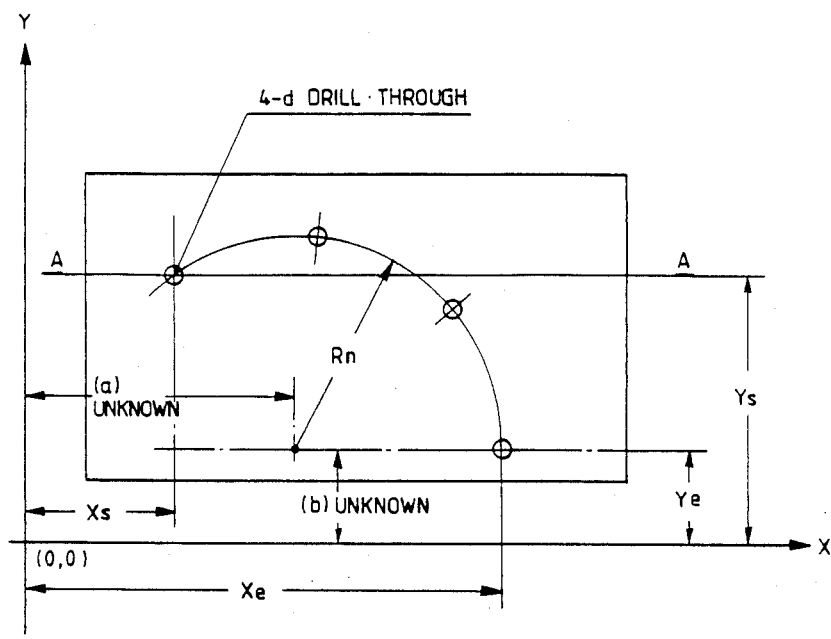
FIG. 7(a) is a plan view showing a workpiece to be machined, for a description of a data inputting method according to the invention.
Figure 7B:
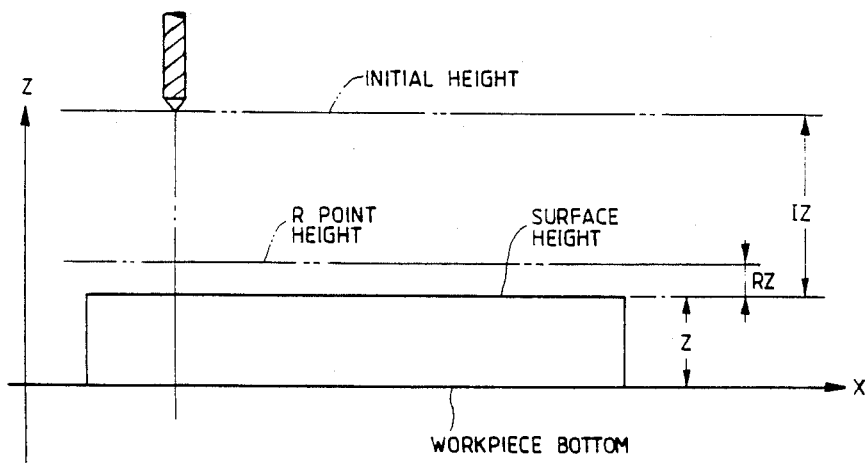
FIG. 7(b) is a sectional view taken along line A—A in the part (a) of FIG. 7(a)

The embodiment of this invention will be described with reference to a data inputting procedure for a drilling operation as shown in FIG. 7.

FIG. 1 is a flow chart outlining a data inputting and processing method in the embodiment. For simplification in description, it is assumed that Steps 1 (automatic programming start) through 6 (graphic display) have been achieved according to the processing procedure.

Step 7 is same as that in the above-described conventional inputting method. In Step 8, a machining position pattern definition is effected.

When the "NEXT PICTURE" key 3021 (FIG. 10) is depressed, the picture is switched over to the drilling pattern selection picture shown in FIG. 2. The drilling operation of FIG. 7 corresponds to "7. BOLT HOLE ARC/CIRCLE" in FIG. 2. Therefore, the echo key 207 (FIG. 10) corresponding to "7. BOLT HOLD ARC/CIRCLE" in the echo data display region 12 is depressed. As a result, the picture is switched over to the drilling pattern definition picture (A) shown in FIG. 3(a). According to the picture, the inputting of the drilling data of FIG. 7 is started.

In the case of FIG. 7, there is no coordinate data for "(1) CENTRAL POSITION", and therefore the inputting of data begins with "(2) POSITIONING DIRECTION". The data inputting procedure is same as that in the above-described conventional method.

(2) POSITIONING DIRECTION -- Input "CCW".

(3) START POINT COORDINATES -- Input Xs and Yx.

(4) END POINT COORDINATES -- Input Xe and Ye.

(5) EQUAL DIVISION MACHINING POINT NUMBER/EQUAL DIVISION ANGLE—Since only the number of holes is indicated, N;4 is inputted (in the case where an equal division angle of 30° is indicated, A;30° is inputted).

(6) PRESENCE OR ABSENCE OF START POINT MACHINING—Because of presence, Input "1".

(7) RADIUS -- Input "Rn".

(8) CENTER COORDINATES DIRECTION -- Input " ↓ ".

(9) SURFACE HEIGHT -- Input "Zn".

(10)R POINT HEIGHT -- Input "RZn".

(11)INITIAL HEIGHT -- Input "IZn".

(12)RETURN HEIGHT -- Input "2=R point height".

Thus, the machining position pattern definition (Step 8) has been accomplished.

Figure 10:
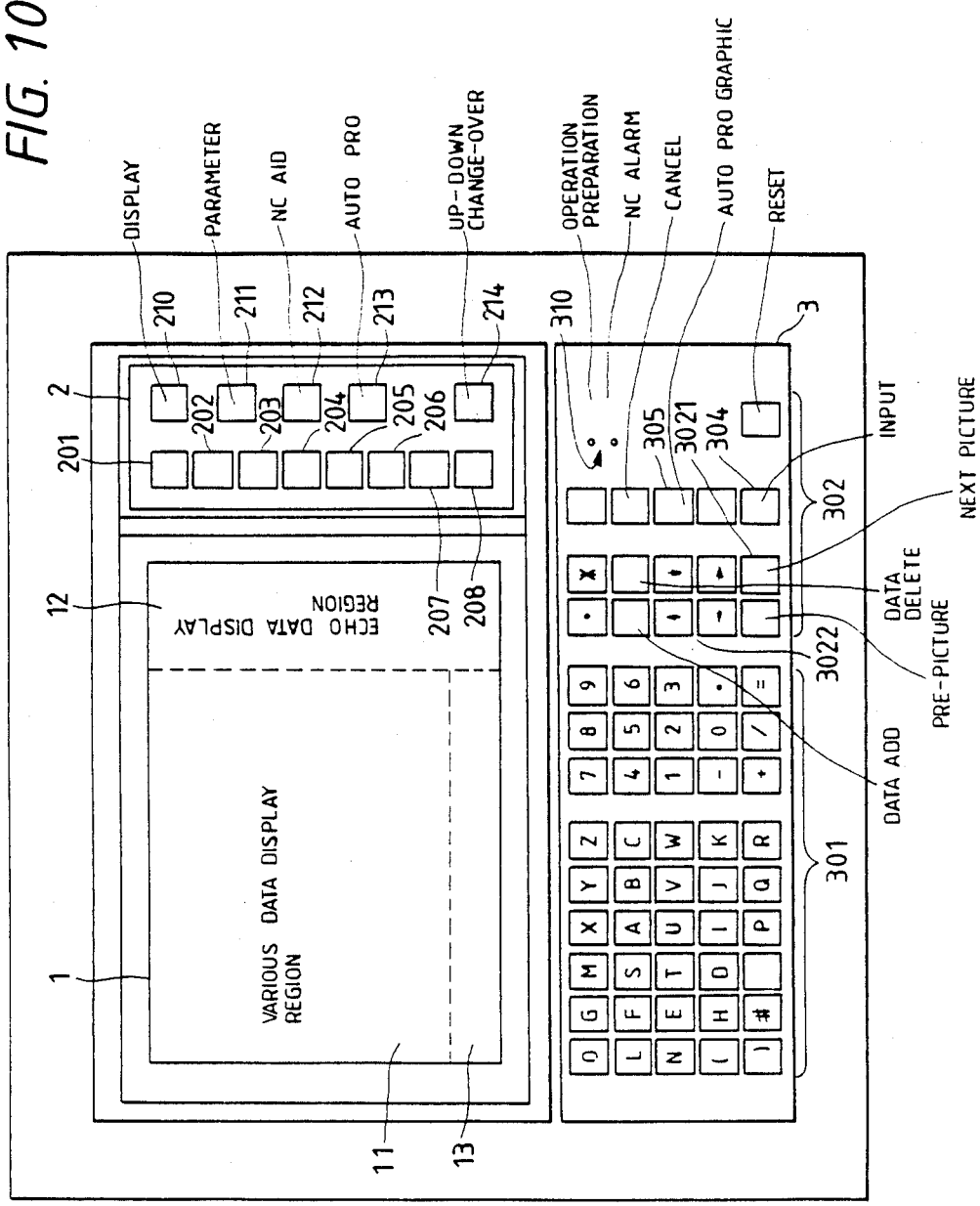
FIG. 10 is a diagram showing data setting and displaying section with a CRT.

Upon depression of the "AUTOMATIC PRO GRAPHIC" key 305 (FIG. 10), the machining pattern is displayed. The operator visually check the pattern thus displayed against the drawing (FIG. 7) for any error. After confirming that all the data have been inputted correctly, the operator depresses the "NEXT PICTURE" key 3021 (FIG. 10). As a result, the drilling pattern selection picture shown in FIG. 2 is displayed again.

Figure 11:
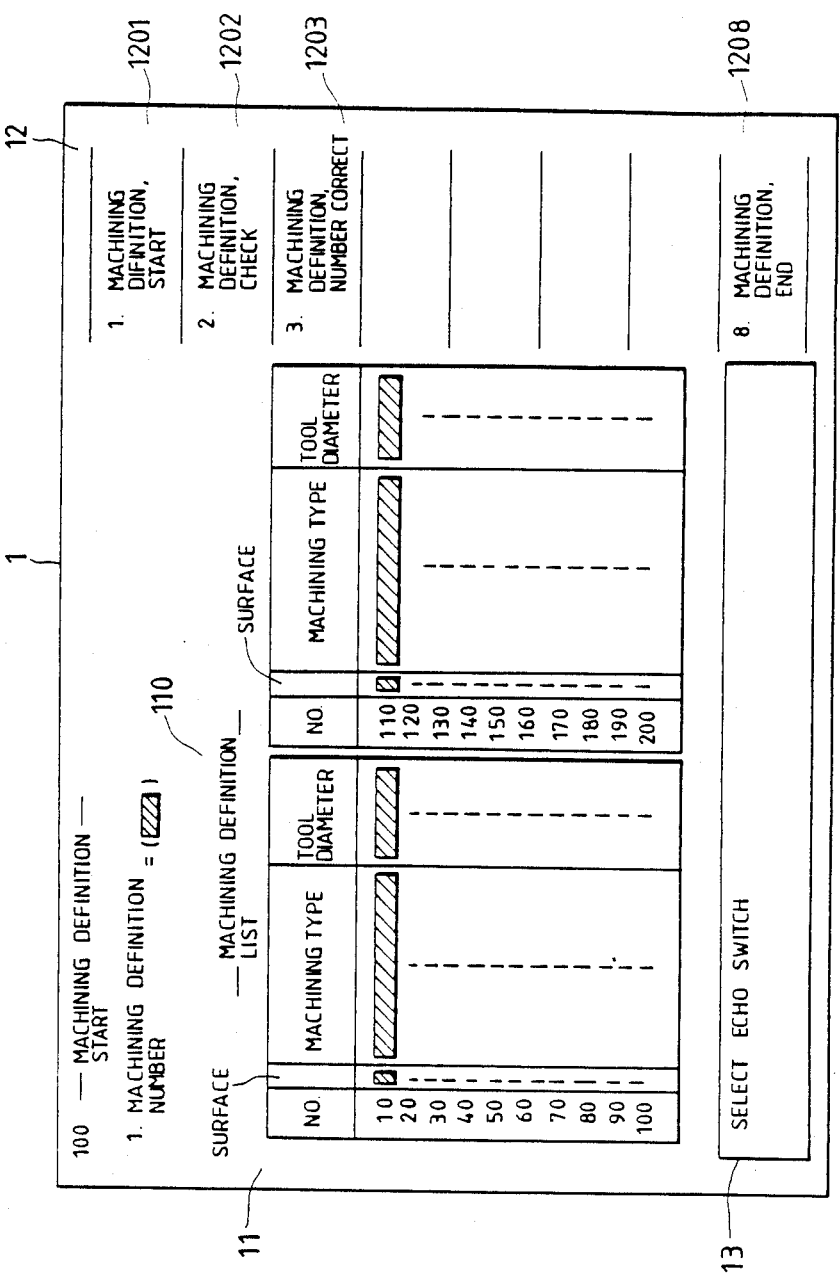
FIG. 11 is a diagram showing a machining definition start picture.
Figure 12:
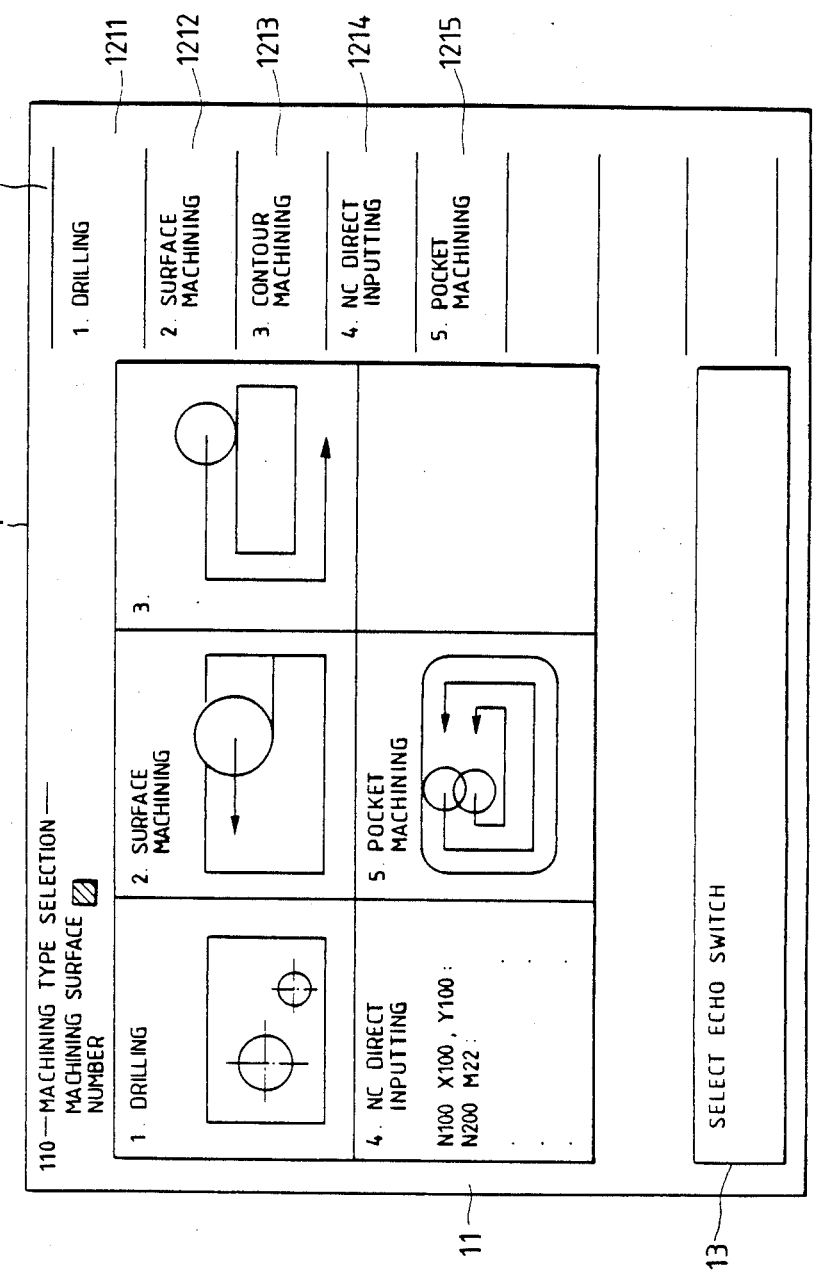
FIG. 12 is a diagram showing a machining type selection picture.
Figure 13:
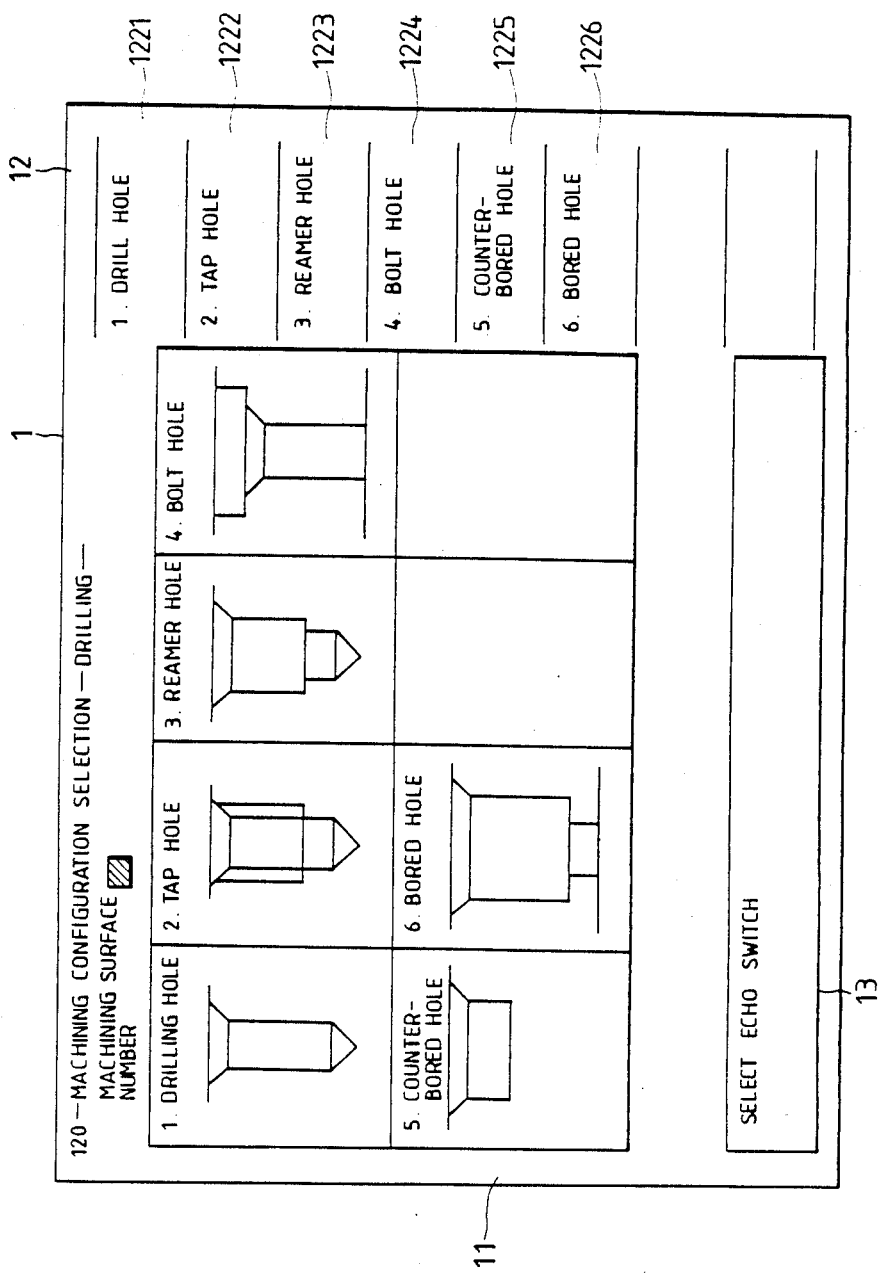
FIG. 13 is a diagram showing drilling configuration selection picture.
Figure 14:
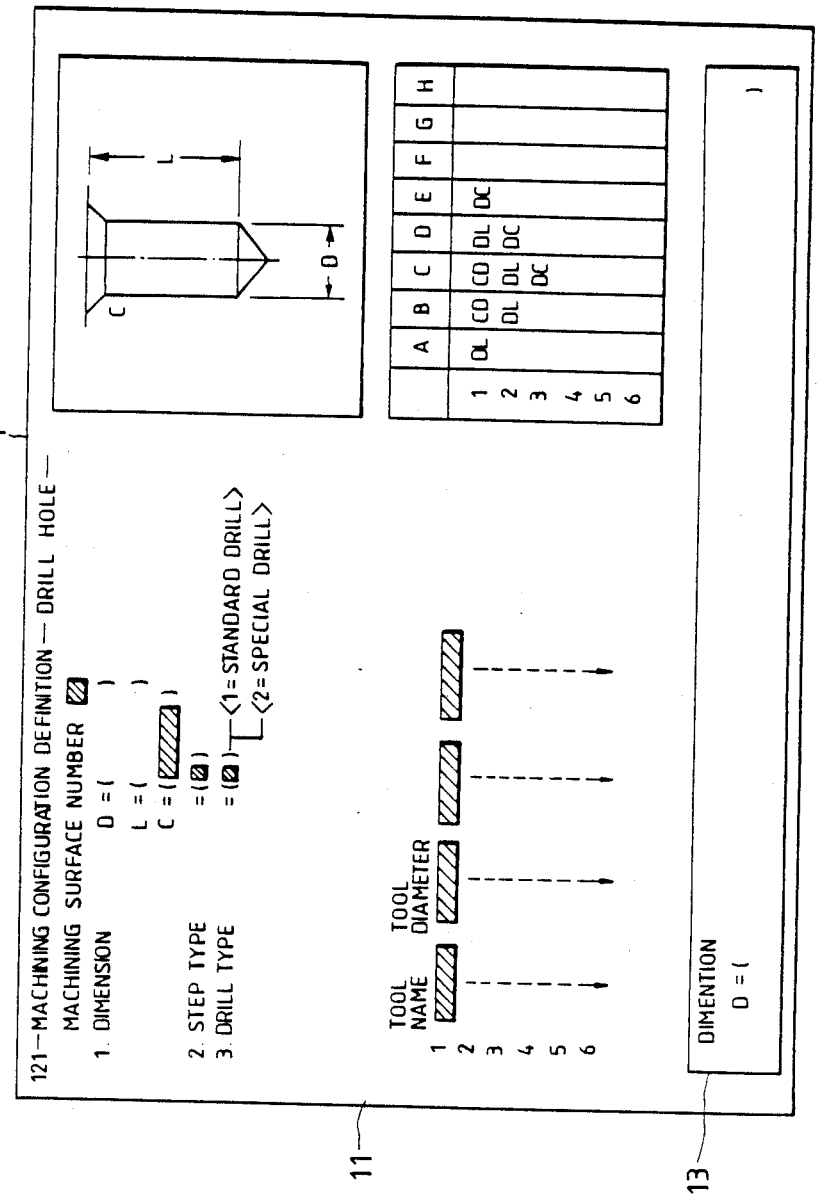
FIG. 14 is a diagram showing a drilling configuration definition picture.
Figure 19:
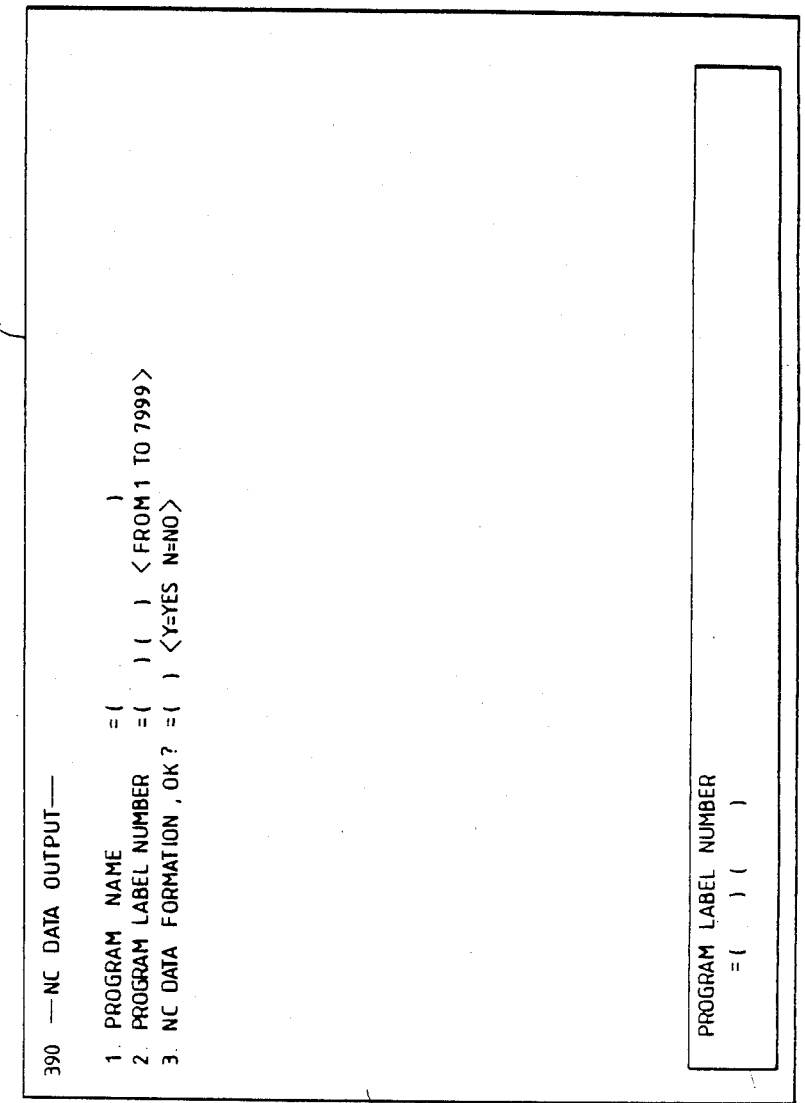
FIG. 19 is a diagram showing an NC data output picture.
Figure 20A:
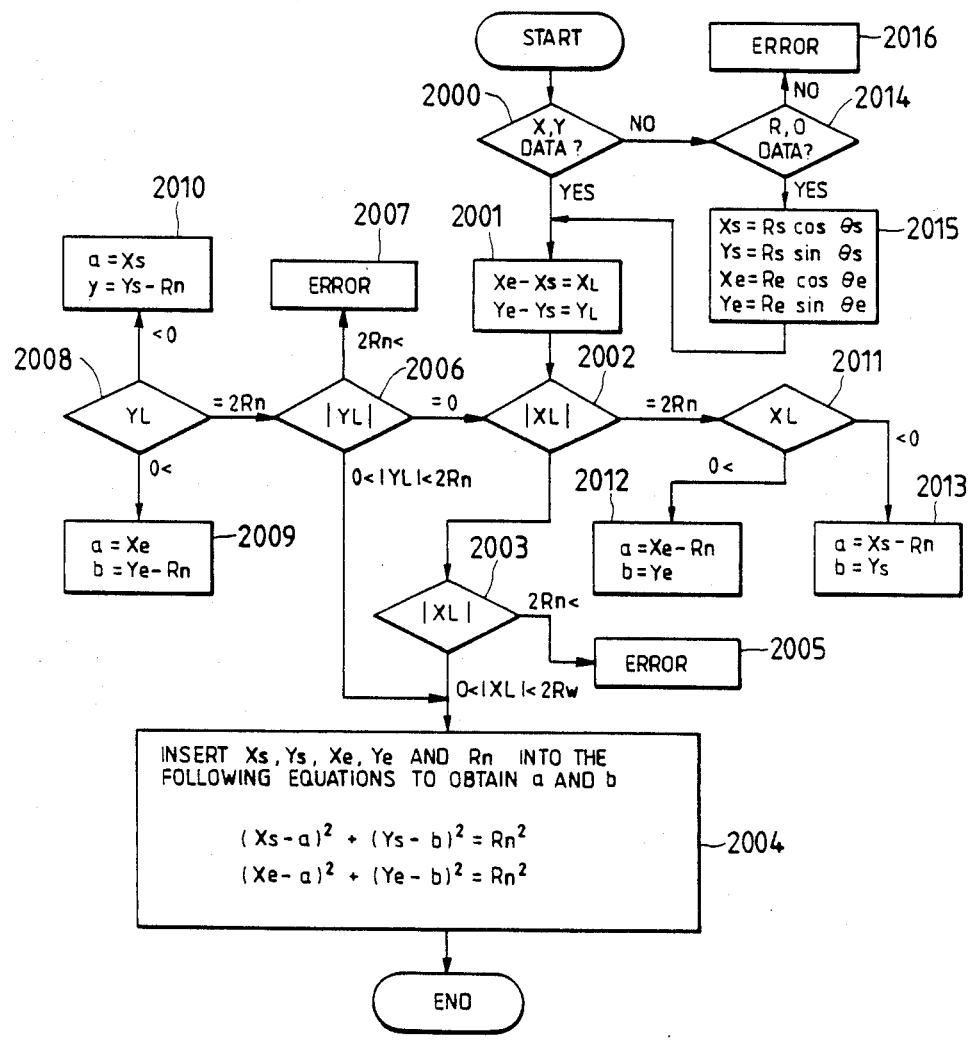
FIG. 20(a) is a flow chart for a description of the operation of a center position.
Figure 20B:
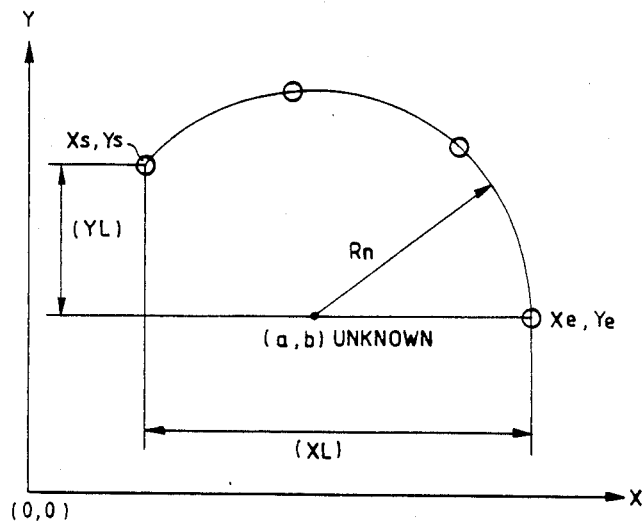
FIG. 20(b) is a diagram showing one example of the inputting of X-Y coordinates.
Figure 20C:
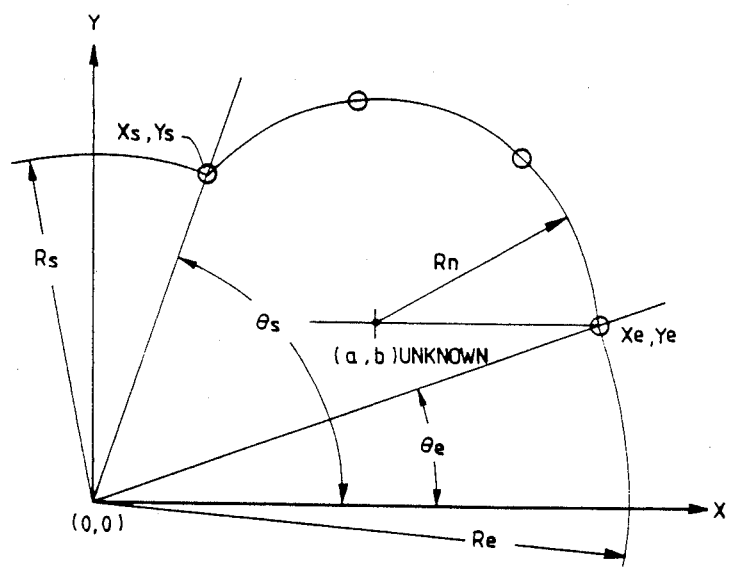
FIG. 20(c) is a diagram showing one example of the inputting of R-θ coordinates.

When, under this condition, the echo switch 208 (FIG. 10) corresponding to "8. DEFINITION ENDS" is depressed, the machining definition start picture shown in FIG. 11 is displayed again, while the machining definition list 110 is displayed in the data display region 11. Thus, the drilling data inputting operation of FIG. 7 has been accomplished. Therefore, the echo key 208 (FIG. 10) corresponding to "8. MACHINING DEFINITION ENDS" 1208 is depressed (Step 71 in FIG. 1). As a result, Step 10 in FIG. 1 is effected, so that the picture is switched over to the machining step list picture (FIG. 18). When the "NEXT PICTURE" key 3021 (FIG. 10) is depressed with the last machining step data displayed in question data region 13 with the cursor keys 3022 (FIG. 10), Step 11 (FIG. 1) is effected, so that formation of NC data is started, and the picture is switched over to the NC data output picture (FIG. 19).

With the picture, the program name, and program label number which has been initially set in the inputting of drilling data with respect to FIG. 7, and NC data formation OK are inputted. Thus, the formation of NC data is started.

In the formation of NC data, it is necessary to process data in a different manner from that in the conventional method, because the embodiment requires data input different from that in the conventional method. Therefore, the operation of coordinates is carried out (FIG. 6) before the data are processed according to the conventional method (the processing not described because not directly related to the invention).

The data inputted with reference to FIG. 7 are processed according to the flow chart shown in FIGS. 6(a) to 6(c) as follows: In the following description, the numerical data parenthesized indicate step numbers and route numbers in the flow chart.

Start (100)—Center position input (101): not available (10102)—Start point and end point data (1011): Available (10103)—X, Y data (1012): Yes (10107) —Positioning direction (1016): Available (10111)—Equal-division machining point number/equal-division angle (105): Available (10501)—Start point machining (106): Available (10601)—Data processing with start point machining being available (107)—Radius (108): Available (10801)—Center position direction 109: Available (10901)—Center position operation subroutine (110)—Machining point coordinates operation subroutine (111)— Processing flow in the conventional method. In this manner, the operation is carried out.

Thus, the center position and machining point coordinates can be operated with the software in the numerical control device. Accordingly, the manual operation of the center position in the conventional method can be eliminated. An example of a center position operation procedure, being provided as software, is combined in the center position operation subroutine (110).

Figure 8A:
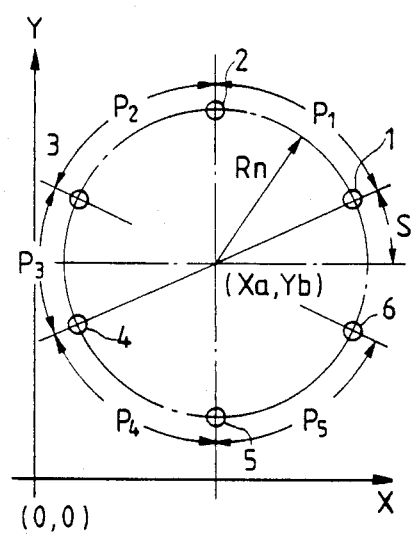
FIG. 8(a) to FIG. 8(d) are plan views showing a machining example, for a description of another data inputting method.
Figure 8B:
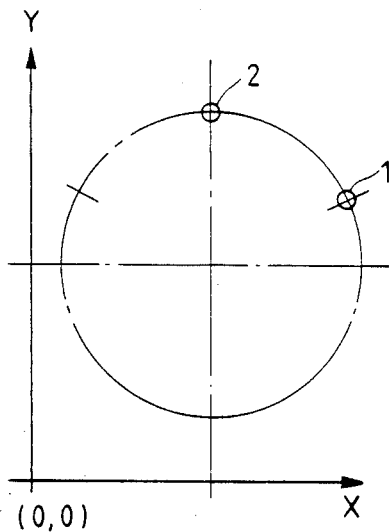
Figure 8C:
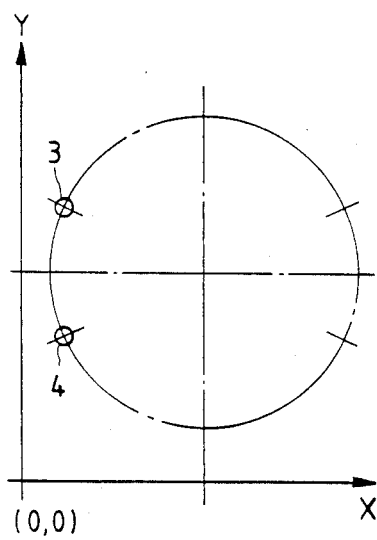
Figure 8D:
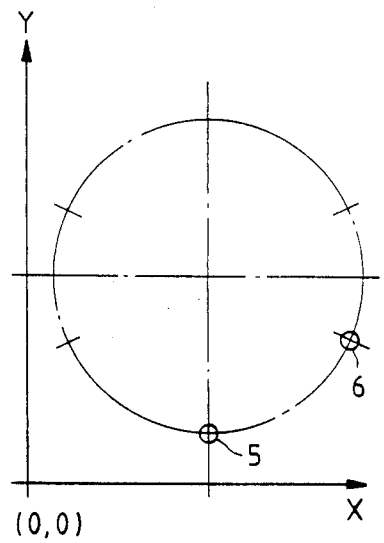

Another embodiment of the invention, a method of inputting and processing data for machining holes as shown in FIG. 8(a), will be described. The processing flow is roughly similar to that shown in FIG. 1. Similarly as in the above-described case, with the assumption that the data processing operation has been achieved up to Step 7 in the same manner as in the conventional method, the operation will be described beginning with the machining position pattern definition of Step 8.

Upon depression of the "NEXT PICTURE" 3021 (FIG. 10), the picture is switched over to the drilling pattern selection picture shown in FIG. 2. The drilling operation of FIG. 8(a) corresponds to "7. BOLT HOLE ARC/CIRCLE" in FIG. 2. Therefore, the echo key 207 (FIG. 10) corresponding to "7. BOLT HOLE ARC/CIRCLE" 1237 in the echo data display region 12, as a result of which the picture is switched over to the hole cutting pattern definition picture (A) shown in FIG. 3(a). With reference to the picture, the hole cutting data indicated in FIG. 8(a) are inputted. The procedure of inputting the data is the same as that in the above-described conventional method.

(1) CENTRAL POSITION—Input Xa and Yb.
(2) POSITIONING DIRECTION—Input CCW.
[(3)START POINT COORDINATES—Not available, and therefore skipped, with the result that the picture is switched over to the drilling pattern definition picture (B) shown in FIG. 4.]
(3) RADIUS—Input Rn.
(4) START ANGLE—Input S.
(5) PITCH ANGLE—Input Random V. The loop of Steps 83 and 8 in FIG. 1 is effected, and P1, P2, P3, P4, P5 and P6 are inputted.
(6) NUMBER—Input "6" (or the inputting may be skipped)
(7) SURFACE HEIGHT—Input Zn.
(8) R POINT HEIGHT—Input ZRn.
(9) INITIAL HEIGHT—Input ZIn.
(10) RETURN HEIGHT—2=R point height is inputted.

Thus, the machining position pattern definition of Step 8 has been accomplished.

The "AUTOMATIC PRO GRAPHIC" 305 (FIG. 10) is depressed to display the machining pattern. The operator checks the pattern against the drawing of the part (a) of FIG. 8 for any error in the data inputting operation. After confirming that all the data have been correctly inputted, the operator depresses the "NEXT PICTURE" key 3021 (FIG. 10). As a result, the drilling pattern selection picture is displayed again. The procedure up to Step 10 is the same as that in the above-described embodiment.

With the NC data output picture (FIG. 19), the program name and program label number which have been initially set (Step 2 in FIG. 1) for inputting the drilling data of FIG. 8(a), and the NC data formation OK are inputted. Thus, the formation of NC data is started.

The formation of NC data requires data operation different from that in the conventional method. Therefore, before the processing flow in the conventional method (the description of which is omitted, being not directly related to the invention) the operation of coordinates is carried out (FIG. 6).

The data inputted with reference to FIG. 8(a) are processed according to the flow chart of FIG. 6 as follows:

Start (100)—Center position input (101): Available (10101)—Positioning direction (102): Available (10201)—Start point coordinate (103): Not Available (10202)—Radius (1031): available (10303)—Start angle (1032): available (10304)—Pitch angle C? (1033): No (10310)—Pitch angle V? (1038): Yes (10311) —P1 through Pn (1039): available (10312)—Machining point operation subroutine (1040)—Steps (10313, and 11101). The coordinates are calculated in this manner.

Thus, the data inputting operation, which is heretofore repeated three times in a data division mode, can be accomplished at one time.

In addition to the above-described example (corresponding to the part (a) of FIG. 5(A)) of the table type data inputting method in which the inputting of the center position is omitted, there are available a variety of examples as shown in the parts (b) through (h) of FIG. 5(A).

In these examples, the following data are inputted in combination in the same manner as that in the above-described embodiment:
POSITIONING DIRECTION: CW/CCW,
START POINT COORDINATES: Xs, Ys / θS, Rs,
END POINT COORDINATES: Xe, Ye / θe, Re,
MACHINING POINT NUMBER / EQUAL-DIVISION ANGLE: Nn / An
PRESENCE OF ABSENCE OF STARTING POINT MACHINING: I/0,
RADIUS: Rn,
CENTER DIRECTION: ←/→/↓/↑.

In the embodiment, the X-Y coordinate system is employed; however, it goes without saying that, instead, the X-Z coordinate system or Y-Z coordinate system may be used. In addition, the processing is carried out according to the flow chart of FIG. 6 which, similarly as in the above-described latter example, makes it possible to input "random pitch angle" instead of "machining point number / equal division angle".

When, in the case where no center position is inputted, "5. EQUAL DIVISION MACHINING POINT NUMBER/EQUAL DIVISION ANGLE" in the hole cutting definition picture (A) FIG. 3(a) is skipped, then the picture shown in FIG. 3(b) is displayed, so that a random pitch angle can be inputted.

In the above-described embodiments of the invention, the display unit comprises the CRT (Cathode Ray Tube); however, instead of it, a dot matrix type display unit may be employed.

The system of the invention is applicable not only to machine tools, robots and laser machining apparatus, but also to welding machines such as spot welding machines, arc welding machines and plug welding machines, gas fusing machines, and adhesive coating machines. For instance in the case of a spot welding machine, the above-described embodiment of the invention can be applied thereto as it is with the welding points regarded as the machining positions; and in the case of an adhesive coating machine, the coating positions can be regarded as the machining positions.

As was described above, according to the invention, in an interaction input format for a numerical control device. The center position is omitted, and the data for drilling holes at random division angle points on an arc or circle can be inputted. Therefore, it is unnecessary to manually calculate the center position, nor to input the data in a division mode. As a result, the number of interactive data inputting steps is reduced, and the program inputting efficiency is improved. In addition, during programming, the frequency of suspending the machining operation is decreased, with the result that the work efficiency of the machining tool or the like is improved.

What is claimed is:

1. A machining data forming system for a numerical control device in which machining data are inputted to the system by input means through operator interaction with a display unit, comprising:
    means for successively displaying on said display unit a machining menu comprising a plurality of questions with regard to either an arc or a circle on which there are machining points;
    means for providing the coordinates of a center positions of the arc or circle based on reference point data inputted via said input means as a response to the questions to display the machining points on the arc or circle on said display unit,
    said input data including at least the coordinates of start and end points of the machining points based on positioning direction ($\theta$) and arc or circle radius (R).
    means for providing the coordinates of a center position of the arc or circle based on data inputted as a response to the questions to display the machining points on the arc or circle on said display unit,
    said input data including at least a random pitch angle.

2. A machining data forming system for a numerical control device as claimed in claim 1, wherein said input data include at least a positing direction, and a sequence of machining is defined according to said positioning direction thus inputted.

3. A machining data forming system for a numerical control device as claimed in claim 1, in order to specify machining points, said input data include data for inputting the presence or absence of start point of machining.

4. A machining data forming system for a numerical control device in which machining data are inputted through interaction with a display unit, comprising:
    means for successively displaying on said display unit a plurality of questions with regard to either an arc or a circle on which there are machining points;
    means for providing the coordinates of a center position of the arc or circle based on data inputted as a response to the questions to display the machining points on the arc or circle on said display unit,
    said input data including at least a random pitch angle.

5. A machining data forming system for a numerical control device as claimed in claim 4, wherein said input data include a positioning direction, and a sequence of machining is defined according to said positioning direction thus inputted.

6. A machining data forming system for a numerical control device as claimed in claim 4, in order to specify machining points, said input data include data for inputting the presence or absence of start point of machining.

7. A machining data forming system for a numerical control device in which machining data for a work piece are inputted to the system by input means through operator interaction with a display unit, comprising:
    means for successively generating for display on said display unit as a machining menu, a plurality of questions in graphic and text form, said questions comprising at least:
      (a) first request for first information defining a work piece machining configuration on the basis of a plurality of displayed candidate machining patterns, said patterns including at least one of an arc and a circle on which there are machining points, and
      (b) second request for second information determining a machining position pattern for application of the defined machining configuration to the work piece on the basis of answers to said request;
    means for calculating first position data comprising coordinates of a center position of said arc or circle, when said coordinates have not been entered directly by the operator, on the basis of second position data inputted by the operator via said input means as a response to said requests for second information, said second position data comprising the coordinates of start and end points of said machining points;
    means for generating numerical control data by processing said first and second position data.

8. A machining data forming system for a numerical control device as claimed in claim 7, wherein said second position data further comprises a positioning direction, and a sequence of machining is defined according to said positioning direction thus inputted.

9. A machining data forming system for a numerical control device as claimed in claim 7, in order to specify machining points, said second position data further comprises data for inputting the presence or absence of start point of machining.

10. A machining data forming system for a numerical control device in which machining data for a work piece are inputted to the system by input means through operator interaction with a display unit, comprising:
    means for successively generating for display on said display unit as a machining menu, a plurality of questions in graphic and text form, said questions comprising at least:
      (a) first requests for first information defining a work piece machining configuration on the basis of a plurality of displayed candidate machining patterns, said patterns including at least one of an arc and a circle on which there are machining points, and
      (b) second requests for second information determining a machining position pattern for application of the defined machining configuration to the work piece on the basis of answers to said requests;
    means for calculating first position data comprising coordinates of a center position of said arc or circle, when said coordinates have not been entered directly by the operator, on the basis of second position data inputted by the operator via said input means as a response to said request for second information, said second position data comprising a random pitch angle;

means for generating numerical control data by processing said first and second position data.

11. A machining data forming system for a numerical control device as claimed in claim 10, wherein said second position data further comprises a positioning direction, and a sequence of machining is defined according to said positioning direction thus inputted.

12. A machining data forming system for a numerical control device as claimed in claim 10, in order to specify machining points, said second position data further comprises data for inputting the presence or absence of start point of machining.

* * * * *